US012700148B2

(12) United States Patent  
Park et al.

(10) Patent No.: US 12,700,148 B2  
(45) Date of Patent: Aug. 4, 2026

(54) ELECTRONIC DEVICE FOR GENERATING USER-PREFERRED CONTENT, AND OPERATING METHOD THEREFOR

(71) Applicant: Samsung Electronics Co., Ltd., Suwon-si (KR)

(72) Inventors: Jaesung Park, Suwon-si (KR); Jiman Kim, Suwon-si (KR); Seongwoon Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 101 days.

(21) Appl. No.: 18/805,858

(22) Filed: Aug. 15, 2024

(65) Prior Publication Data

US 2024/0404126 A1 Dec. 5, 2024

Related U.S. Application Data

(63) Continuation of application No. PCT/KR2023/002526, filed on Feb. 22, 2023.

(30) Foreign Application Priority Data

Mar. 22, 2022 (KR) ........................ 10-2022-0035541

(51) Int. Cl.  
*G06T 11/10* (2026.01)  
*G06F 3/16* (2006.01)  
(Continued)

(52) U.S. Cl.  
CPC ................ *G06T 11/10* (2026.01); *G06F 3/16* (2013.01); *G06V 10/462* (2022.01); *G06V 10/82* (2022.01)

(58) Field of Classification Search  
None  
See application file for complete search history.

(56) References Cited

U.S. PATENT DOCUMENTS 10,685,057 B1* 6/2020 Chavez ................. G06F 16/248  
10,891,969 B2 1/2021 Huang et al.  
(Continued)

FOREIGN PATENT DOCUMENTS

CN 108920648 A 11/2018  
CN 113190709 A 7/2021  
(Continued)

OTHER PUBLICATIONS

Gaurav Kabra, Mahipal Jadeja, "Style Transfer for Videos with Audio", Feb. 20, 2021, Springer, Proceedings of the International Conference on Paradigms of Computing, Communication and Data Sciences, Chapter 48, pp. 607-617.*

(Continued)

*Primary Examiner* — Robert Bader  
(74) *Attorney, Agent, or Firm* — STAAS & HALSEY LLP

(57) ABSTRACT

Provided are an electronic device for generating user-preferred content, and an operating method of the electronic device. The operating method may include: obtaining first content including at least one of an image or audio; detecting at least one feature to be used to change a style of content, by applying the first content to a feature detection model; generating second content including an image-audio pair by applying the first content and the at least one feature of the first content to a neural style transfer model, wherein the neural style transfer model is trained to determine an image or audio to be included in the second content, and generate the second content by changing a style of the first content; and outputting the second content.

13 Claims, 15 Drawing Sheets

(51) Int. Cl.
    *G06V 10/46*     (2022.01)
    *G06V 10/82*     (2022.01)

(56)            References Cited

U.S. PATENT DOCUMENTS

| | | | |
|---|---|---|---|
| 11,010,124 B2 | 5/2021 | Kim et al. | |
| 11,164,042 B2 | 11/2021 | Sommerlade et al. | |
| 11,488,576 B2 | 11/2022 | Park et al. | |
| 2018/0204121 A1 | 7/2018 | Wang | |
| 2019/0057356 A1* | 2/2019 | Larsen | G06V 40/28 |
| 2019/0088237 A1 | 3/2019 | DePietro, III | |
| 2020/0117348 A1* | 4/2020 | Jang | G06F 3/04845 |
| 2020/0265817 A1 | 8/2020 | Elkins | |
| 2021/0027748 A1* | 1/2021 | Jang | G06T 11/10 |
| 2021/0193110 A1 | 6/2021 | Park et al. | |
| 2021/0217443 A1* | 7/2021 | Abraham | G06T 11/00 |
| 2021/0311618 A1* | 10/2021 | Barton | G06T 11/00 |
| 2022/0108431 A1* | 4/2022 | Baran | G06T 5/50 |
| 2022/0319534 A1* | 10/2022 | Krishnan Gorumkonda | G10L 21/007 |
| 2022/0335944 A1 | 10/2022 | Kameoka et al. | |
| 2022/0383580 A1* | 12/2022 | Rohmetra | G06N 3/0495 |

FOREIGN PATENT DOCUMENTS

| | | |
|---|---|---|
| JP | 2021-43264 | 3/2021 |
| KR | 10-0916310 | 9/2009 |
| KR | 10-2019-0094314 | 8/2019 |
| KR | 10-2019-0118994 | 10/2019 |
| KR | 10-2021-0088656 | 7/2021 |

OTHER PUBLICATIONS

Seung Hyun Lee, Wonseok Roh, Wonmin Byeon, Sang Ho Yoon, Chan Young Kim, Jinkyu Kim, Sangpil Kim, "Sound-Guided Semantic Image Manipulation", Nov. 30, 2021, arxiv.org, arXiv:2112.00007v1, retrieved from https://arxiv.org/abs/2112.00007.*

Chaitanya Ahuja, Dong Won Lee, Yukiko I. Nakano, Louis-Philippe Morency, "Style Transfer for Co-Speech Gesture Animation: A Multi-Speaker Conditional-Mixture Approach", Jul. 24, 2020, arxiv.org, arXiv:2007.12553v1, retrieved from https://arxiv.org/abs/2007.12553.*

G. Atarsaikhan et al., "Guided neural style transfer for shape stylization", PLOS One https://doi.org/10.1371/journal.pone.0233489 Jun. 4, 2020, pp. 1-23.

International Search Report, PCT/ISA/210, dated Jun. 9, 2023, in PCT Application No. PCT/KR2023/002526.

Written Opinion, PCT/ISA/237, dated Jun. 9, 2023, in PCT Application No. PCT/KR2023/002526.

Lee Cheng-Che et al: "Crossing You in Style: Cross-modal Style Transfer from Music to Visual Arts", Poster Session G2: Multimedia—Art and Entertainment, Cloud and Edge Computing, Data Systems, and HCI, MM '20 Oct. 12-16, 2020.

Luan Fujun et al: "Deep Photo Style Transfer", 2017 IEEE Conference on Computer Vision and Pattern Recognition, Computer Society, pp. 6997-7005.

Supplemental European Search Report dated Mar. 13, 2025 issued in European Application No. EP 23 77 5177.

\* cited by examiner

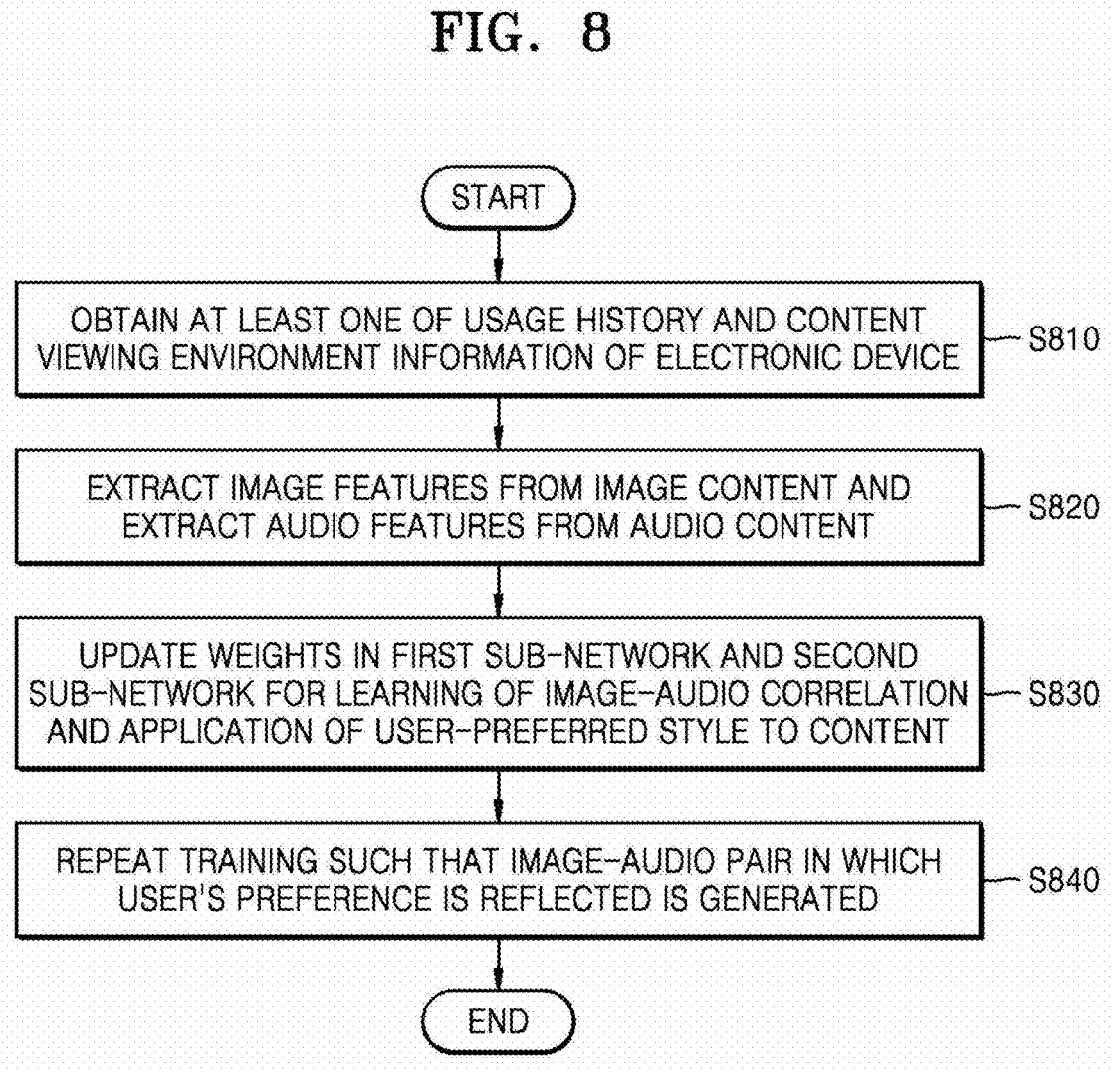

START

OBTAIN AT LEAST ONE OF USAGE HISTORY AND CONTENT VIEWING ENVIRONMENT INFORMATION OF ELECTRONIC DEVICE —— S810

EXTRACT IMAGE FEATURES FROM IMAGE CONTENT AND EXTRACT AUDIO FEATURES FROM AUDIO CONTENT —— S820

UPDATE WEIGHTS IN FIRST SUB-NETWORK AND SECOND SUB-NETWORK FOR LEARNING OF IMAGE-AUDIO CORRELATION AND APPLICATION OF USER-PREFERRED STYLE TO CONTENT —— S830

REPEAT TRAINING SUCH THAT IMAGE-AUDIO PAIR IN WHICH USER'S PREFERENCE IS REFLECTED IS GENERATED —— S840

END

ELECTRONIC DEVICE FOR GENERATING USER-PREFERRED CONTENT, AND OPERATING METHOD THEREFOR

CROSS-REFERENCE TO RELATED APPLICATIONS

This application is a continuation of International Application PCT/KR2023/002526, filed Feb. 22, 2023, and claims foreign priority to Korean Application 10-2022-0035541, filed Mar. 22, 2022, which are incorporated herein by reference in their entireties.

TECHNICAL FIELD

The present disclosure relates to an electronic device for generating user-preferred content, and an operating method of the electronic device.

BACKGROUND ART

Examples of emerging technologies utilizing artificial intelligence include image style transfer for transforming an input image into a particular style, audio style transfer for transforming input audio into a particular style, etc.

However, when intending to use both a style-changed image and style-changed audio together, separately trained image style transfer/audio style transfer result in a generated image and audio lacking correlation, which lowers a user's content experience satisfaction. In addition, there are cases in which a user wants to create a user-preferred image/video by using only audio input, or a user wants to generate user-preferred audio by using only an image/video.

There is a need to provide users of electronic devices with a new content experience by reflecting user preferences and using a style transfer and/or generator model that has a high image-audio correlation.

DISCLOSURE

Technical Solution

According to an aspect of the present disclosure, a method, performed by an electronic device, of generating user-preferred content may be provided. The method may include obtaining first content including at least one of an image or audio. The method may include detecting at least one feature to be used to change a style of the first content, by applying the first content to a feature detection model. The method may include applying the first content and the at least one feature to a neural style transfer (NST) model. The neural style transfer model may be trained to generate a second content based on the first content and the at least one feature applied to the NST model by changing the style of the first content. The second content may include an image audio pair in which an image or audio is determined by the NST model. The method may include outputting the second content.

According to an aspect of the present disclosure, the method may further include obtaining a usage history of the electronic device, wherein the applying may further include applying the usage history of the electronic device to the NST model, and the NST model may be further trained to generate the second content based on the usage history of the electronic device applied to the NST model.

According to an aspect of the present disclosure, the usage history of the electronic device may include at least one of a history related to applications that have been executed by the electronic device, a history related to content that has been reproduced by the electronic device, and a history related to external sources that have been connected to and used by the electronic device.

According to an aspect of the present disclosure, the method may further include obtaining content viewing environment information including at least one of illuminance and chromaticity of a space where the electronic device is located. The applying may further include applying the content viewing environment information to the NST model, and the NST model may be further trained to generate the second content based on the content viewing environment information applied to the NST model.

According to an embodiment of the present disclosure, the detecting of the at least one feature may include, based on the first content including an image, detecting one or more main objects from the image.

According to an embodiment of the present disclosure, the detecting of the at least one feature may include determining the one or more main objects based on a user input.

According to an embodiment of the present disclosure, the NST model may include a first sub-network configured to change a style of an image and a second sub-network configured to change a style of audio, and at least some layers of the first sub-network may be connected to at least some layers of the second sub-network, for weight sharing between the first sub-network and the second sub-network.

According to an aspect of the present disclosure, an electronic device for generating user-preferred content may be provided. The electronic device may include: a memory storing one or more instructions; and a processor configured to execute the one or more instructions stored in the memory.

By executing the one or more instructions, the processor may obtain first content including at least one of an image or audio. By executing the one or more instructions, the processor may detect at least one feature to be used to change a style of the first content, by applying the first content to a feature detection model. By executing the one or more instructions, the processor may apply the first content and the at least one feature to a neural style transfer (NST) model. The neural style transfer model may be trained to generate a second content based on the first content and the at least one feature applied to the NST model by changing the style of the first content. The second content may include an image audio pair in which an image or audio is determined by the NST model. By executing the one or more instructions, the processor may output the second content.

According to an aspect of the present disclosure, the processor may be further configured to execute the one or more instructions to obtain a usage history of the electronic device, and apply the usage history of the electronic device to the NST model, The NST model may be further trained to generate the second content based on the usage history of the electronic device applied to the NST model.

According to an aspect of the present disclosure, the usage history of the electronic device may include at least one of a history related to applications that have been executed by the electronic device, a history related to content that has been reproduced by the electronic device, and a history related to external sources that have been connected to and used by the electronic device.

According to an aspect of the present disclosure, the processor may be further configured to execute the one or more instructions to obtain content viewing environment information including at least one of illuminance and chromaticity of a space where the electronic device is located, and apply the content viewing environment information to the NST model. The NST model may be further trained to generate the second content based on the content viewing environment information applied to the NST model.

According to an aspect of the present disclosure, the processor may be further configured to execute the one or more instructions to, based on the first content including an image, detect one or more main objects from the image.

According to an aspect of the present disclosure, the processor may be further configured to execute the one or more instructions to determine the one or more main objects based on a user input.

According to an aspect of the present disclosure, the NST model may include a first sub-network configured to change a style of an image and a second sub-network configured to change a style of audio. At least some layers of the first sub-network may be connected to at least some layers of the second sub-network, for weight sharing between the first sub-network and the second sub-network.

According to another aspect of the present disclosure, there may be provided a non-transitory computer-readable recording medium having recorded thereon a program for executing any one of the methods of generating user-preferred content described above.

DESCRIPTION OF DRAWINGS

FIG. 6A is a diagram illustrating an example of an image content feature detection model used by an electronic device, according to an embodiment of the present disclosure.

FIG. 8 is a flowchart of an operation, performed by an electronic device, of training a neural style transfer model, according to an embodiment of the present disclosure.

FIG. 11 is a diagram for describing an operation, performed by an electronic device, of receiving an input of a preferred style from a user, according to an embodiment of the present disclosure.

FIG. 13 is a block diagram illustrating a configuration of a server according to an embodiment of the disclosure.

MODE FOR INVENTION

Figure 1:
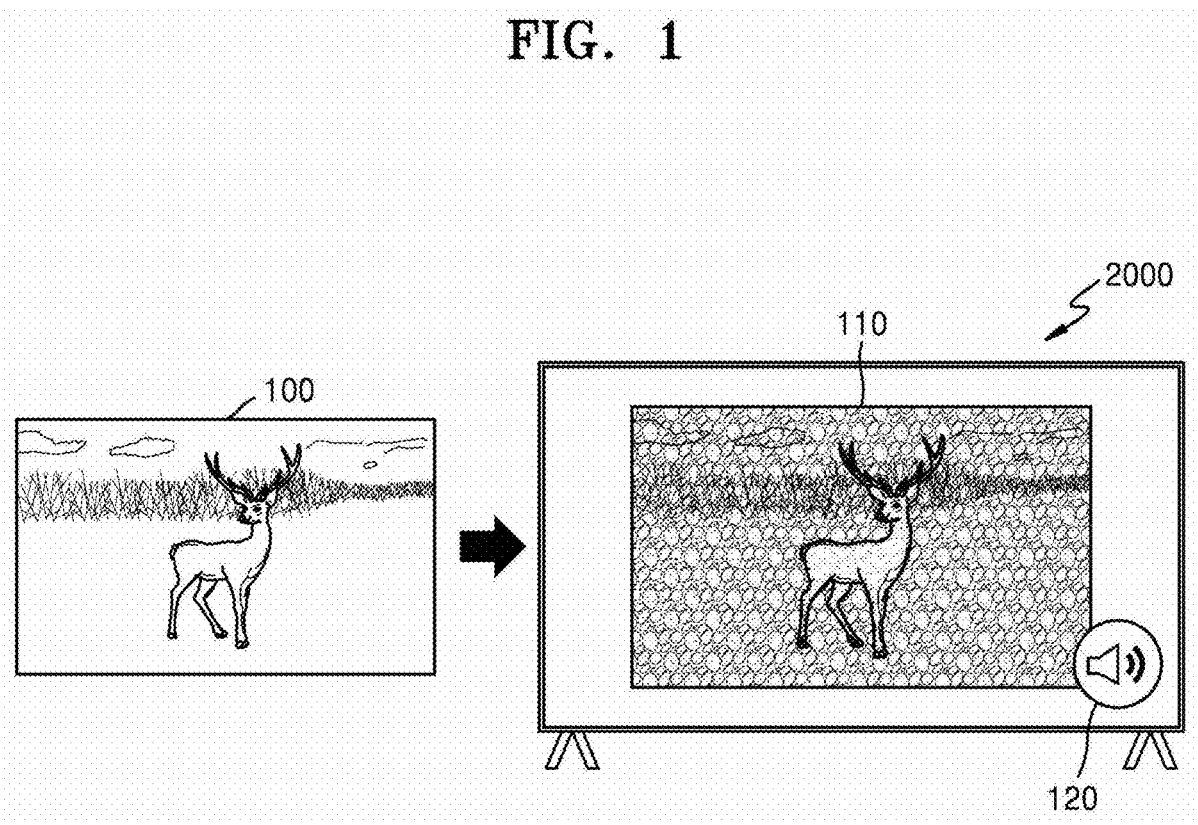
FIG. 1 is a diagram illustrating an example in which an electronic device generates and outputs user-preferred content, according to an embodiment of the present disclosure.

The terms used herein will be briefly described, and then the present disclosure will be described in detail. As used herein, the expression "at least one of a, b, or c" may indicate only a, only b, only c, both a and b, both a and c, both b and c, all of a, b, and c, or variations thereof. Similarly, the expression "at least one of a, b, and c" may indicate only a, only b, only c, both a and b, both a and c, both b and c, all of a, b, and c, or variations thereof.

Although the terms used herein are selected from among common terms that are currently widely used in consideration of their functions in the present disclosure, the terms may be different according to an intention of one of ordinary skill in the art, a precedent, or the advent of new technology. In addition, in certain cases, there are also terms arbitrarily selected by the applicant, and in this case, the meaning thereof will be defined in detail in the description. Therefore, the terms used herein are not merely designations of the terms, but the terms are defined based on the meaning of the terms and content throughout the present disclosure.

The singular expression may also include the plural meaning as long as it is not inconsistent with the context. All the terms used herein, including technical and scientific terms, may have the same meanings as those generally understood by those of skill in the art. In addition, although the terms such as 'first' or 'second' may be used herein to describe various elements, these elements should not be limited by the terms. These terms are only used to distinguish one element from another element.

Throughout the present specification, when a part "includes" a component, it means that the part may additionally include other components rather than excluding other components as long as there is no particular opposing recitation. In addition, as used herein, the terms such as " . . . er (or)", " . . . unit", " . . . module", etc., denote a unit that performs at least one function or operation, which may be implemented as hardware or software or a combination thereof.

Hereinafter, embodiments of the present disclosure will be described in detail with reference to the accompanying drawings to allow those of skill in the art to easily carry out the embodiments. The present disclosure may, however, be embodied in many different forms and should not be construed as being limited to the embodiments set forth herein. In addition, in order to clearly describe the present disclosure, portions that are not relevant to the description of the present disclosure are omitted, and similar reference numerals are assigned to similar elements throughout the present specification.

Hereinafter, the present disclosure will be described in detail with reference to the accompanying drawings.

FIG. 1 is a diagram illustrating an example in which an electronic device generates and outputs user-preferred content, according to an embodiment of the present disclosure.

Referring to FIG. 1, an electronic device 2000 may be a device including a display and capable of outputting an image and/or a video. For example, the electronic device 2000 may include, but is not limited to, a smart television (TV), a smart phone, a tablet personal computer (PC), a laptop PC, a frame-type display, etc., and the electronic device 2000 may be implemented in various types and forms of electronic devices that include a display. In addition, the electronic device 2000 may include a speaker to output audio.

The electronic device 2000 may obtain original content and generate image-audio pair content by changing the style of the original content. For example, the electronic device 2000 may obtain an image 100, which is original content, and generate a result image 110 in which a user-preferred style is reflected in the image 100, based on features of the obtained image 100. In addition, the electronic device 2000 may determine audio corresponding to the image 100, which is the original content. The electronic device 2000 may generate result audio 120 in which the user-preferred style is reflected in the audio, based on features of the audio. Hereinafter, the original image 100, that is, the content before a style change, is referred to as first content. In addition, an image-audio pair of the result image 110 and the result audio 120 is referred to as second content. Although FIG. 1 illustrates that the first content is the image 100, but the first content may be audio. In this case as well, the electronic device 2000 may generate second content including an image-audio pair, in which the user-preferred style is reflected.

In an embodiment, the electronic device 2000 may generate second content including the result image 110 and the result audio 120, by using a neural style transfer model.

The neural style transfer model may be an artificial intelligence model configured to transfer previously learned styles to first content that includes original content of an image or audio, such that the first content has a particular style. That is, the neural style transfer model is an artificial intelligence model configured to generate second content that includes the contents of input first content but has a new style. In addition, the neural style transfer model may be an artificial intelligence model that has learned user-preferred styles according to embodiments to be described below.

Referring again to FIG. 1, the contents of the image 100, which is the input first content, are 'deer', and the result image 110 of the second content is an image in which a new style is applied to the image of 'deer'. Meanwhile, the result audio 120 of the second content is audio in which a new style is applied to original audio. In this case, the original audio before a style change may be audio that has been previously learned to have a high correlation with 'deer', and is selected based on 'deer', which is the contents of the image 100 that is the first content.

According to the disclosed embodiments, new content in which a user preference is reflected may be obtained in correspondence to the original content. In addition, according to the disclosed embodiments, even in a case in which the original content includes only an image, image-audio content in which a user preference is reflected may be obtained in correspondence to the original content. In addition, according to the disclosed embodiments, even in a case in which the original content includes only audio, image-audio content in which a user preference is reflected may be obtained in correspondence to the original content.

Detailed operations by which the electronic device 2000 obtains first content and applies a user-preferred style to generate second content including an image-audio pair will be described in more detail below with reference to drawings.

Figure 2:
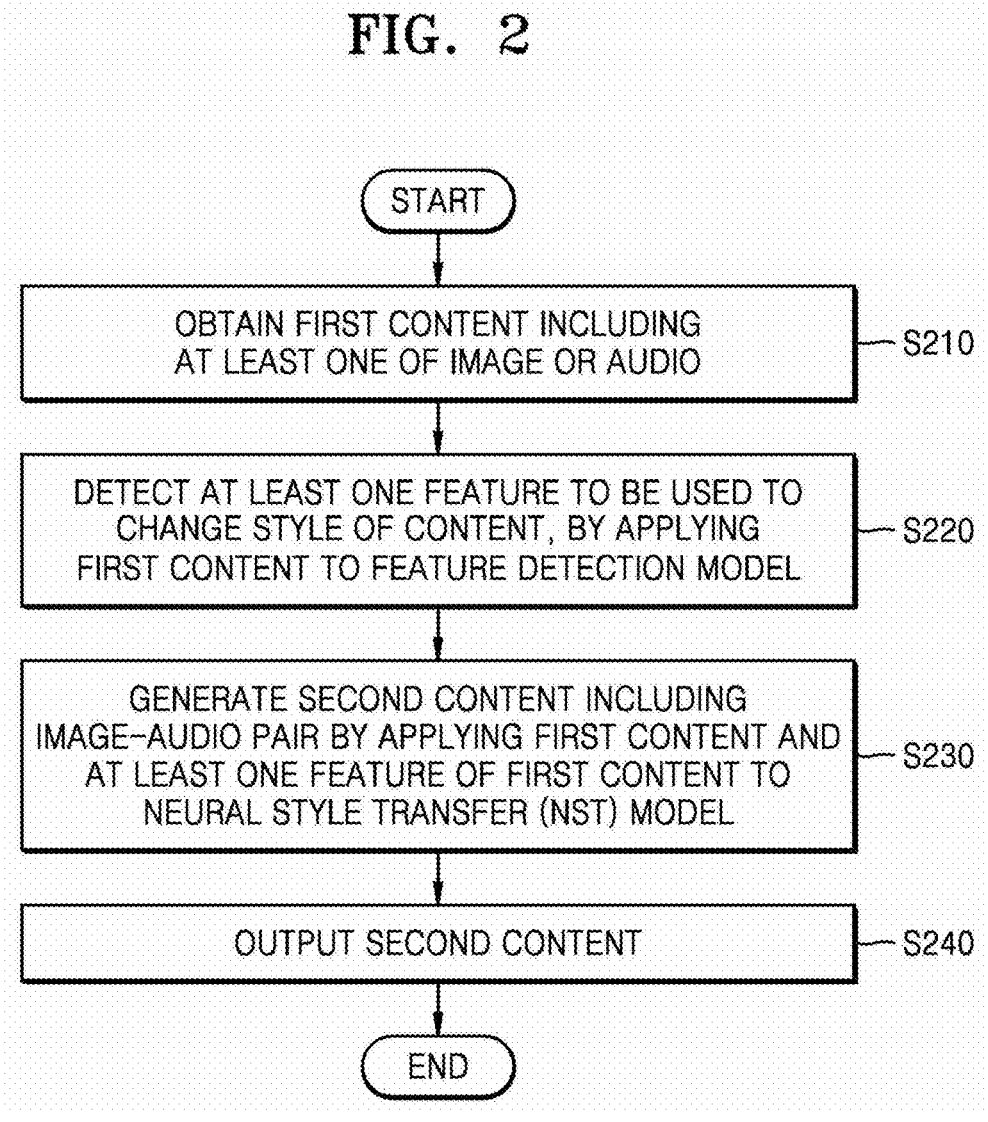
FIG. 2 is a flowchart for describing a method, performed by an electronic device, of generating content, according to an embodiment of the present disclosure.

FIG. 2 is a flowchart for describing a method, performed by an electronic device, of generating content, according to an embodiment of the present disclosure.

In operation S210, the electronic device 2000 obtains first content including at least one of an image or audio.

In an embodiment, the first content may be original content before the style of the content is changed by the electronic device 2000. When a user of the electronic device 2000 intends to generate second content, which is new content, by reflecting a style preferred by the user, the first content corresponds to the content to be changed. The second content is content generated based on the first content by reflecting the user's preferred style, and includes an image-audio pair.

In an embodiment, the first content may be any one of an image or audio. In some embodiments, the electronic device 2000 may obtain image content as first content, and generate second content including an image-audio pair based on the obtained image content. In some embodiments, the electronic device 2000 may obtain audio content as first content, and generate second content including an image-audio pair based on the obtained audio content.

In an embodiment, first content may be an image and audio. In some embodiments, for content including an image and audio (e.g., a video), the electronic device 2000 may obtain, based on a user input for selecting any one of the image or the audio, the selected image or audio as first content, and generate second content including an image-audio pair. In some embodiments, the electronic device 2000 may obtain image content and audio content as first content, and generate second content including an image-audio pair.

In an embodiment, the electronic device 2000 may obtain, as first content, content currently being reproduced by the electronic device 2000. The electronic device 2000 may identify, as first content, at least one of an image or audio currently being reproduced by the electronic device 2000. In some embodiments, the electronic device 2000 may obtain, as first content, content that has been reproduced at a particular time point in the past. For example, the electronic device 2000 may obtain, as first content, the most recently reproduced content.

In an embodiment, the electronic device 2000 may obtain first content based on a user input. The electronic device 2000 may obtain first content based on a user input for inputting at least one of an image or audio.

In an embodiment, the electronic device 2000 may obtain first content from an external device (e.g., an external server).

In operation S220, the electronic device 2000 detects at least one feature to be used to change the style of the content, by applying the first content to a feature detection model. In the present disclosure, the feature detection model may be referred to as a content feature detection model.

In an embodiment, the feature detection model may be an artificial intelligence model for detecting features such as a salient object or a pattern in content. The electronic device 2000 may store various types of feature detection models for detecting features of content according to the type of the content. For example, in a case in which the first content is an image, the feature detection model may be a model configured to detect features such as a main object in the image. For example, in a case in which the first content is audio, the feature detection model may be a model configured to detect features such as the main frequency bandwidth of the audio. In some embodiments, in a case in which there is one or more main objects, the electronic device 2000 may determine the main object based on a user input.

In operation S230, the electronic device 2000 generates second content including an image-audio pair by applying the first content and at least one feature of the first content to a neural style transfer (NST) model.

In an embodiment, the neural style transfer model may be an artificial intelligence model configured to transfer a style of previously learned pieces of style content, to input target content (i.e., first content), such that the input content has a particular style. That is, the neural style transfer model is an artificial intelligence model configured to generate new content (i.e., second content) that includes the contents of input content but has a new style.

The neural style transfer model may be a model trained to change the style of content to reflect a user's content preference. That is, the neural style transfer model may be a model trained to receive first content and generate second content that has a changed style reflecting the user's preference and includes an image-audio pair. The neural style transfer model may include a first sub-network configured to change the style of an image, and a second sub-network configured to change the style of audio. In this case, in order to generate an image-audio pair with a high correlation, some layers of the first sub-network of the neural style transfer model and some layers of the second sub-network may be connected to each other to share weights. In some embodiments, the neural style transfer model may include a plurality of models. For example, the neural style transfer model may include a first model configured to change the style of an image, and a second model configured to change the style of audio.

In an embodiment, the electronic device 2000 may determine an image or audio to be included in second content by using the neural style transfer model. For example, in a case in which the first content is an image, the audio corresponding to the image may be determined. In addition, in a case in which the first content is audio, an image corresponding to the audio may be determined. The electronic device 2000 may determine an image-audio pair by determining other content corresponding to the first content, and generate second content of which the style is changed through the neural style transfer model. In addition, in some embodiments, the electronic device 2000 may generate a digital art work by recording the generated second content in a blockchain network as a non-fungible token (NFT).

In operation S240, the electronic device 2000 outputs the second content.

In an embodiment, the second content includes an image-audio pair. The electronic device 2000 may output an image through a display and audio through a speaker.

Figure 3:
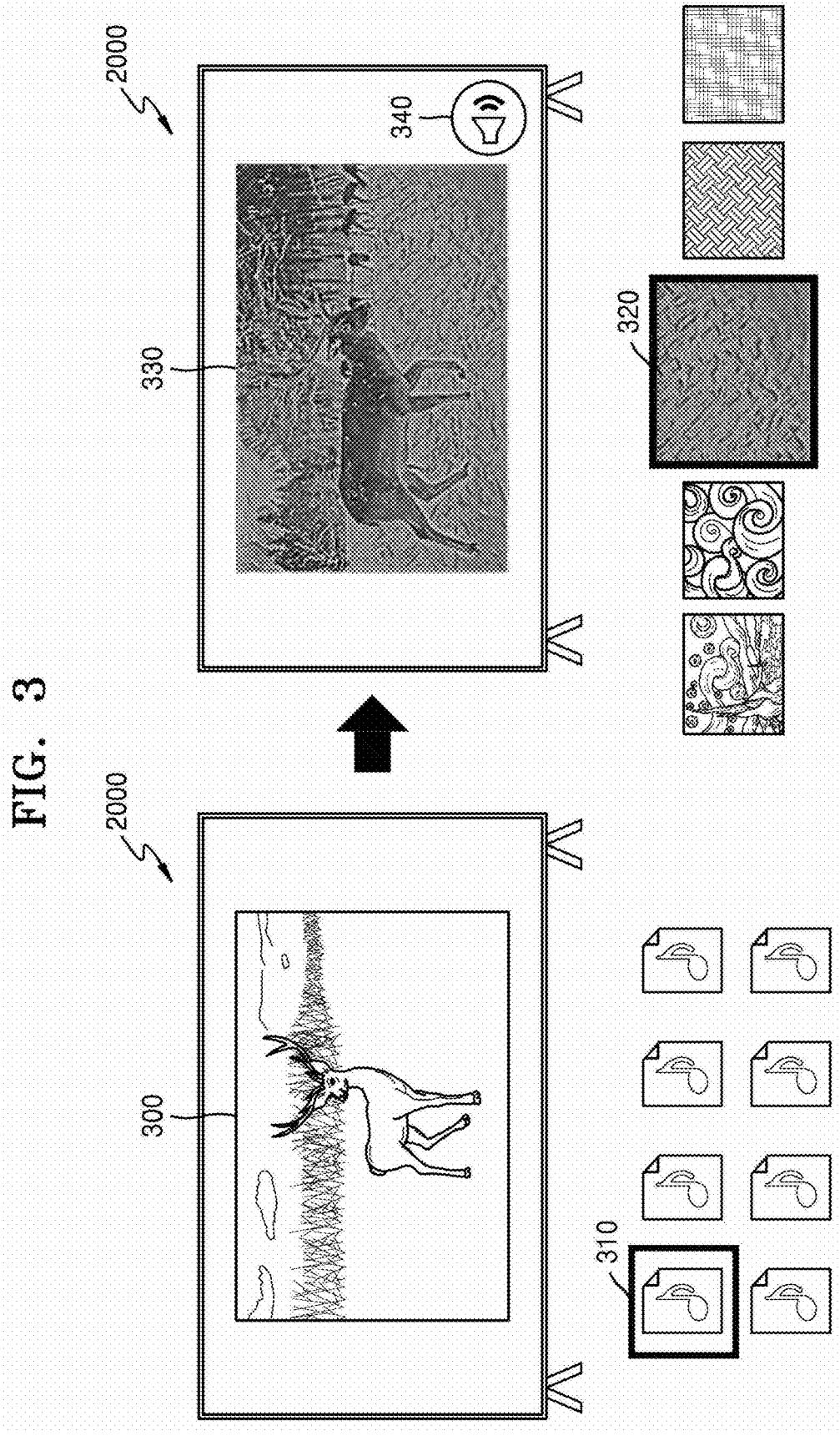
FIG. 3 is a diagram for describing an operation, performed by an electronic device, of generating second content, according to an embodiment of the present disclosure.

FIG. 3 is a diagram for describing an operation, performed by an electronic device, of generating second content, according to an embodiment of the present disclosure.

In an embodiment, the electronic device 2000 obtains first content and generates second content including an image-audio pair that is stylized based on the first content. In explaining FIG. 3, for convenience of explanation, an example in which the first content is an image 300 will be described. However, the first content is not limited thereto and may be various media content such as audio or a video.

In an embodiment, the electronic device 2000 obtains the image 300 as first content. The electronic device 2000 may apply the image 300 to a feature detection model to detect at least one image feature. The image feature may include, for example, the color tone of the image, the type, location, and size of a main object in the image, and the type, location, and size of a subobject, but is not limited thereto. For example, the electronic device 2000 may detect 'deer', which is a main object in the image 300, as a feature of the image 300, by using the feature detection model. In some embodiments, in a case in which there is one or more main objects, the electronic device 2000 may determine the main object based on a user input.

In an embodiment, the electronic device 2000 may determine content corresponding to the first content, and obtain an image-audio pair. In some embodiments, the electronic device 2000 may determine content corresponding to the first content by using a neural style transfer model. In this case, the neural style transfer model may include an image-audio bonding weight that has learned an image-audio correlation. For example, because the first content is the image 300, the electronic device 2000 may determine audio 310 corresponding to the image 300 from among a plurality of pieces of audio.

In an embodiment, the electronic device 2000 may generate second content in which a user-preferred style is reflected, by using the neural style transfer model. The second content includes a result image 330 and result audio 340, that is, an image-audio pair.

The result image 330 of the second content is a result of applying, to the image 300, any one of a plurality of user-preferred image styles learned by the neural style transfer model. For example, from among the plurality of user-preferred image styles, one image style 320 may be applied. In this case, 'deer', which is a feature of the image 300, is target content to which a style is to be applied, and the image style 320 is a style to be expressed in the result image 330 including 'deer'.

The result audio 340 of the second content is a result of applying, to the audio 310, any one of a plurality of user-preferred audio styles learned by the neural style transfer model. For example, among the plurality of user-preferred audio styles, any one audio style may be applied.

The electronic device 2000 according to some embodiments may generate a digital art work by recording the generated second content in a blockchain network as a non-fungible token (NFT). The electronic device 2000 may generate an NFT for the second content to verify that the second content in which the user-preferred style is reflected is owned by the user.

The electronic device 2000 may obtain first content including at least one of an image or audio, and output second content including an image-audio pair in which a user-preferred style is reflected. For example, the electronic device 2000 may output the result image 330 through a display, and output the result audio 340 through a speaker. Detailed operations by which the electronic device 2000 applies a user-preferred style to content will be described below.

Figure 4:
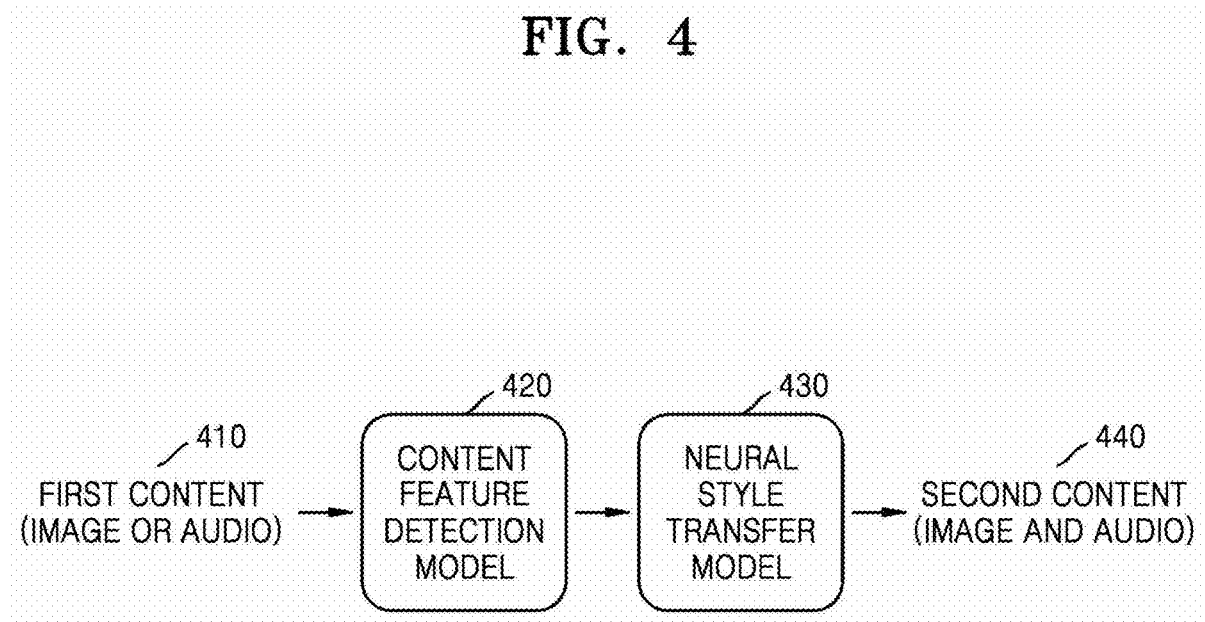
FIG. 4 is a diagram illustrating a process in which an electronic device generates second content from first content by using artificial intelligence models, according to an embodiment of the present disclosure.

FIG. 4 is a diagram illustrating a process in which an electronic device generates second content from first content by using artificial intelligence models, according to an embodiment of the present disclosure.

The electronic device 2000 may obtain first content 410. The first content 410 may be at least one of an image or audio. The electronic device 2000 may use a content feature detection model 420 to obtain at least one feature of the first content 410 that is output from the content feature detection model 420, by applying the first content 410 to the content feature detection model 420. For example, in a case in which the first content 410 is an image, the content feature detection model 420 may detect features such as a main object in the image. In this case, when the neural style transfer model changes the style of the image, the at least one detected feature of the content may be used to change the style based on the main object. Alternatively, in a case in which the first content 410 is audio, the content feature detection model 420 may be a model configured to detect features such as the main frequency bandwidth of the audio. In this case, when the neural style transfer model changes the style of the audio, the at least one detected feature of the content may be used to change the style based on the main frequency bandwidth.

The electronic device 2000 may generate second content 440 by using a neural style transfer model 430. The second content 440 may include an image-audio pair and may be applied with a new style while maintaining the features of the first content 410 to a certain extent. For example, in a case in which the first content 410 is an image, the electronic device 2000 may determine audio content corresponding to the first content 410, and generate second content by changing the first content 410 (image) and the style of the content (audio) corresponding to the first content. As another example, in a case in which the first content 410 is audio, the electronic device 2000 may determine image content corresponding to the first content 410, and generate second content by changing the first content 410 (audio) and the style of the content (image) corresponding to the first content.

In an embodiment, the second content 440 generated through the neural style transfer model 430 is content in which the user's preference is reflected.

In an embodiment, the electronic device 2000 may generate second content to which a user-preferred style is applied, based on a usage history (executed applications, reproduced content, etc.) of the electronic device 2000. In this case, the neural style transfer model 430 may be a model that has learned user-preferred styles identified from the usage history of the electronic device 2000.

In an embodiment, the electronic device 2000 may generate second content to which a user-preferred style is applied, based on content viewing environment information including the illuminance and chromaticity of a space where the electronic device 2000 is located. In some embodiments, the electronic device 2000 may obtain content viewing environment information by receiving sensed illuminance and chromaticity from a separate sensor, or by obtaining illuminance and chromaticity based on a user input. Based on the content viewing environment information of the electronic device 2000, the electronic device 2000 may generate second content to which a user-preferred style, which is similar to the style of the content viewing environment (e.g., similar illuminance or similar chromaticity), is applied. In this case, the neural style transfer model 430 may be a model that has learned user-preferred styles, which may correspond to the content viewing environment of the electronic device 2000. Meanwhile, the content viewing environment information is not limited to the above-described example, and may include various pieces of information such as the ambient temperature of the electronic device 2000, weather, ambient noise, or time.

Figure 5:
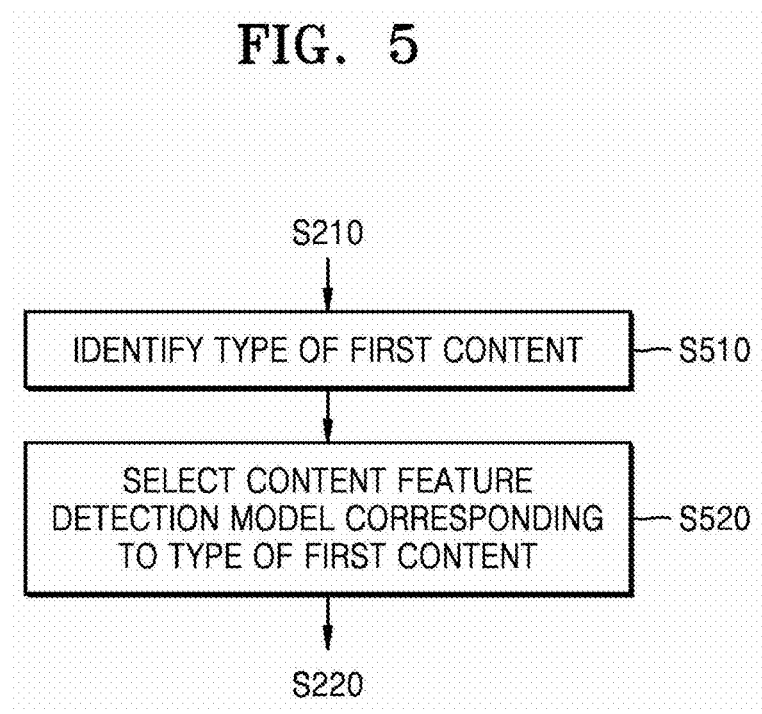
FIG. 5 is a flowchart for describing a method, performed by an electronic device, of detecting features of first content, according to an embodiment of the present disclosure.

FIG. 5 is a flowchart for describing a method, performed by an electronic device, of detecting features of first content, according to an embodiment of the present disclosure.

In operation S510, the electronic device 2000 identifies the type of first content. The electronic device 2000 may identify whether the first content is image, audio, or both image and audio (e.g., video). Operation S510 may be performed after operation S210 of FIG. 2 is performed.

In operation S520, the electronic device 2000 selects a content feature detection model corresponding to the type of the first content.

In an embodiment, in a case in which the type of the first content is image, the electronic device 2000 may select a content feature detection model configured to detect at least one feature in an image. The feature of the image may include, for example, the color tone of the image, the type, location, and size of a main object in the image, and the type, location, and size of a subobject, but is not limited thereto.

In an embodiment, in a case in which the type of the first content is audio, the electronic device 2000 may select a content feature detection model for detecting at least one feature in audio. The feature of the audio may include the genre of the audio, the main frequency bandwidth of the audio, loudness, spectral flatness, spectral irregularity, pitch, modulation in the temporal domain (rate), modulation in the frequency domain (scale), and the like, but is not limited thereto.

In an embodiment, in a case in which the type of the first content is both image and audio (e.g., video), the electronic device 2000 may select content feature detection models respectively for detecting features of an image and detecting features of audio. In some embodiments, in a case in which the first content includes both an image and audio, and a user input for selecting any one of the image and the audio is received, the electronic device 2000 may select a content feature detection model for detecting features of content corresponding to the user input.

Figure 6A:
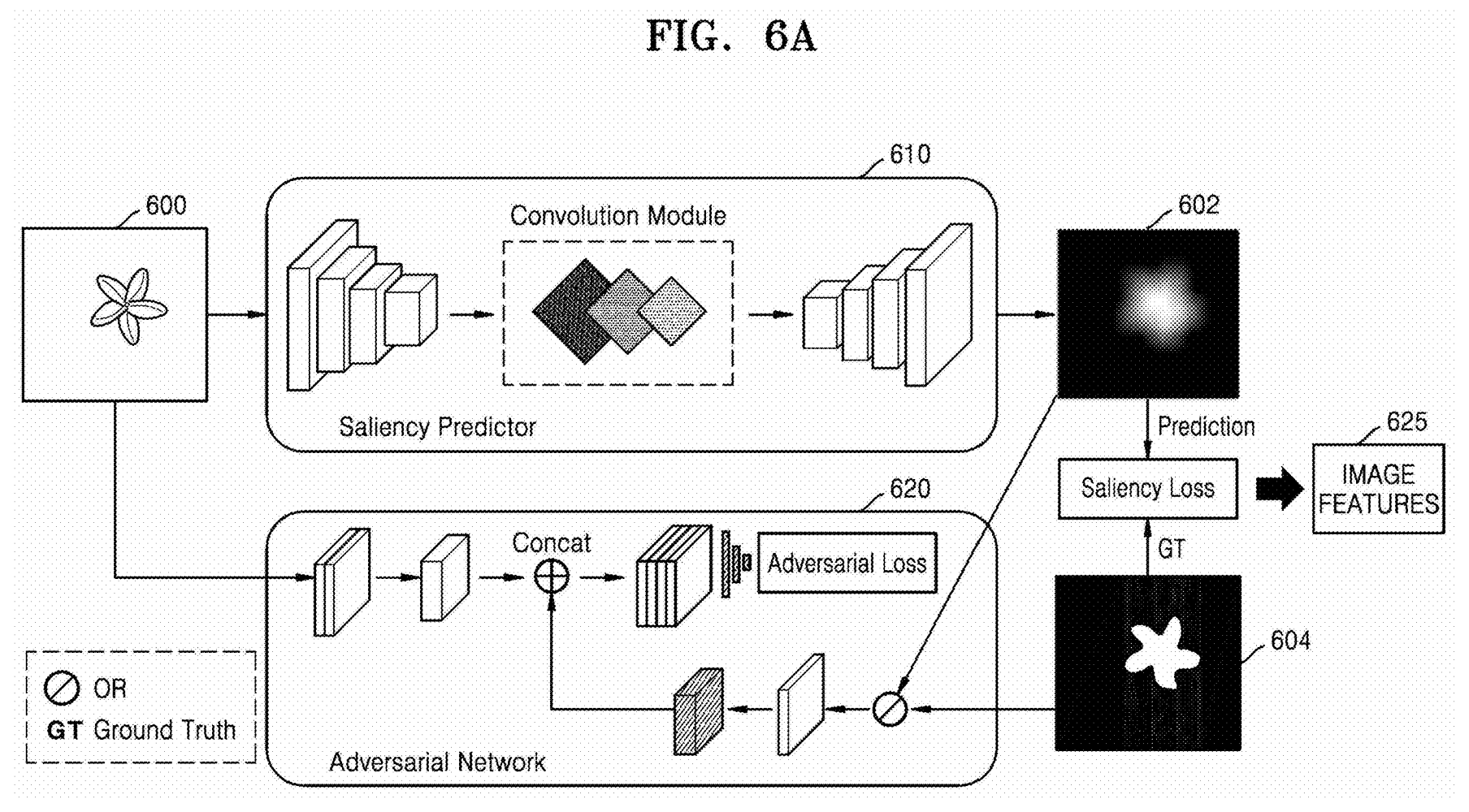

FIG. 6A is a diagram illustrating an example of an image content feature detection model used by an electronic device, according to an embodiment of the present disclosure.

In an embodiment, an image content feature detection model may detect image features 625 from an image 600. The image features 625 may include, for example, the color tone of the image, the type, location, and size of a main object in the image, and the type, location, and size of a subobject, but are not limited thereto. A model for detecting a saliency map, which is configured to detect, as the image features 625, an area of an object in an image, will be described as an example with reference to FIG. 6A. However, the image content feature detection model described below is only an example, and artificial intelligence model with various architectures for detecting at least one of the image features 625 described above may be used as an image content feature detection model.

The image content feature detection model according to an example may include a saliency predictor 610 and an adversarial network 620.

The saliency predictor 610 receives the image 600 and outputs a saliency map 602. The saliency predictor 610 is trained such that the saliency map 602 predicted from the saliency predictor 610 is close to a ground-truth saliency map 604. The saliency predictor may include a convolution module configured to perform at least pooling, convolution, and concatenation operations. In order to train the image content feature detection model, the saliency predictor 610 may label the predicted saliency map 602 as the ground-truth saliency map 604 although the predicted saliency map 602 is not actually the ground-truth saliency map 604, and cause the adversarial network 620 to determine the predicted saliency map 602, which is labeled as the ground-truth saliency map 604.

The adversarial network 620 is trained to receive the image 600 and any one of the saliency map 602 predicted by the saliency predictor 610 or the ground-truth saliency map 604, and determine whether the received data is the saliency map 602 or the ground-truth saliency map 604. The adversarial network 620 may update weights of the adversarial network 620 based on an adversarial loss.

By training the saliency predictor 610 and the adversarial network 620, the image content feature detection model according to an example may calculate a saliency loss and update weights of the image content feature detection model based on the saliency loss. In this case, the completely trained image content feature detection model may obtain a 'saliency map', which is the image features 625, from the image 600.

In some embodiments, the obtained image features 625 may be used as contents to which stylization is to be applied. In some embodiments, the obtained image features 625 may be used as data for determining a style to be applied to the first content.

Figure 6B:
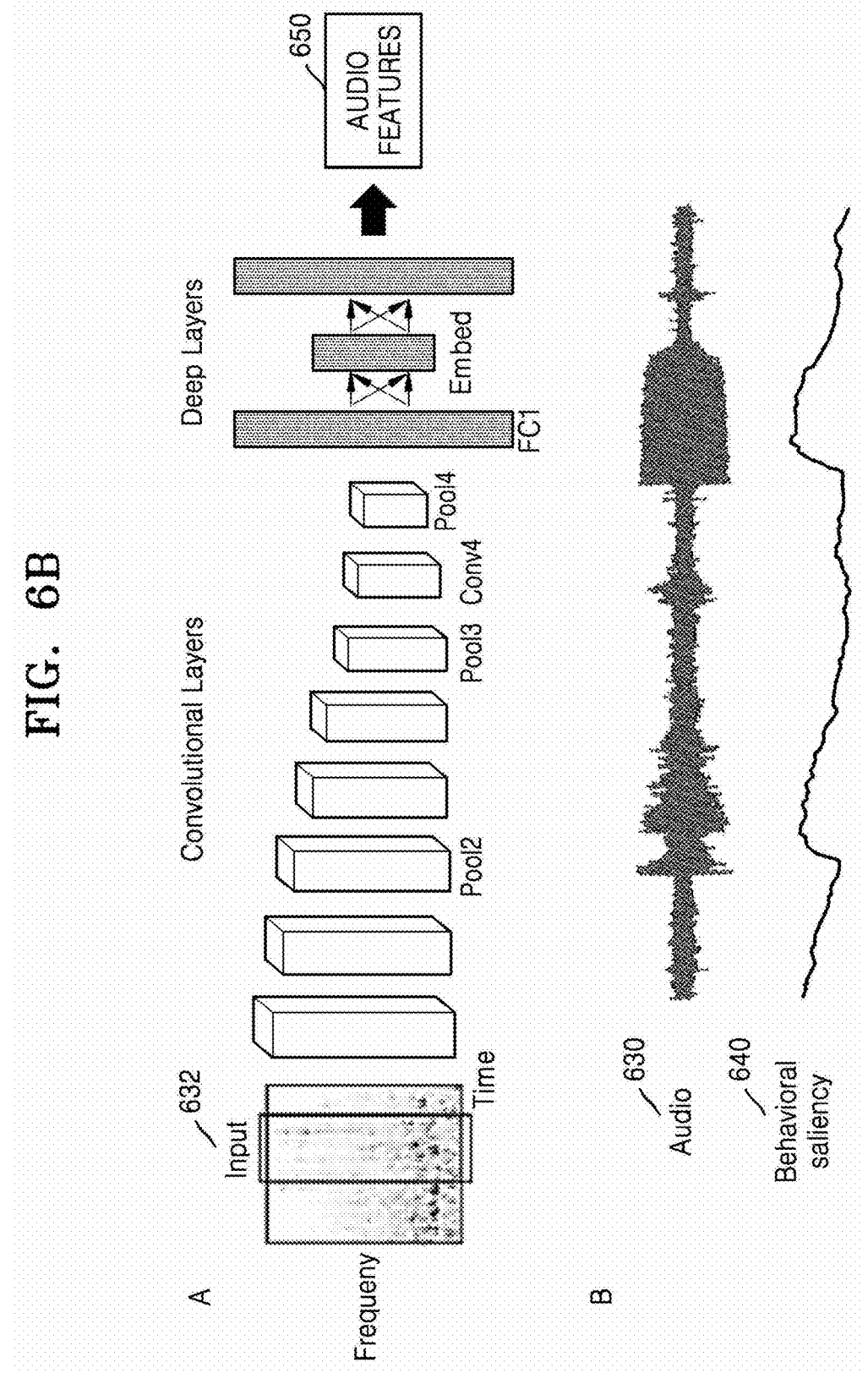
FIG. 6B is a diagram illustrating an example of an audio content feature detection model used by an electronic device, according to an embodiment of the present disclosure.

FIG. 6B is a diagram illustrating an example of an audio content feature detection model used by an electronic device, according to an embodiment of the present disclosure.

In an embodiment, an audio content feature detection model may detect audio features 650 from audio 630.

The audio features 650 may include the genre of the audio, the main frequency bandwidth of the audio, loudness, spectral flatness, spectral irregularity, pitch, modulation in the temporal domain (rate), modulation in the frequency domain (scale), and the like, but are not limited thereto. A convolutional neural network will be described as an example of the audio content feature detection model with reference to FIG. 6B. However, the audio content feature detection model described below is only an example, and the audio content feature detection model may be an artificial intelligence model with various architectures for detecting at least one of the audio features 650 described above.

The audio feature detection model according to an example may include a plurality of convolutional layers configured to perform at least pooling, convolution, and concatenation operations. In an example, the audio feature detection model may receive, as an input, a time-frequency spectrogram 632 of the audio 630, and output the audio features 650 by analyzing features of the time-frequency spectrogram 632. For example, the main frequency bandwidth of the audio 630 may be output from the audio feature detection model. As another example, a classification result indicating the genre of the audio 630 may be output from the audio feature detection model.

In an embodiment, the audio feature detection model may use, as training data, behavioral salience, which is data obtained by measuring audio regions of interest of human listeners. The audio feature detection model may learn audio regions of interest of human listeners to detect the audio features 650 reflecting an audio region of interest of a human listener.

In some embodiments, the obtained audio features 650 may be used as contents to which stylization is to be applied. In some embodiments, the obtained audio features 650 may be used as data for determining a style to be applied to the first content.

Figure 7:
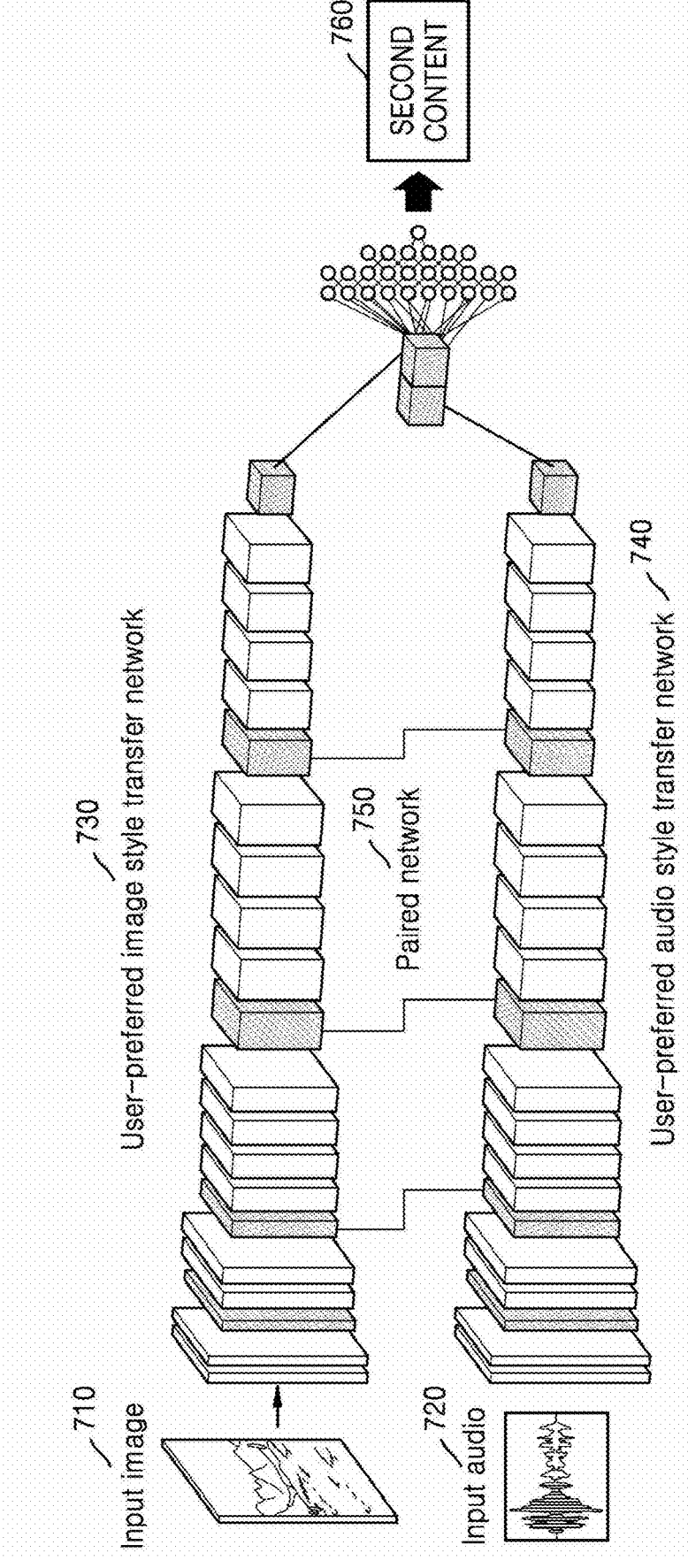
FIG. 7 is a diagram illustrating an example of a neural style transfer model used by an electronic device, according to an embodiment of the present disclosure.

FIG. 7 is a diagram illustrating an example of a neural style transfer model used by an electronic device, according to an embodiment of the present disclosure.

In an embodiment, the electronic device 2000 may generate second content 760 to which a style reflecting a user's preference is applied, by using a neural style transfer model. The second content 760 may include an image-audio pair. The neural style transfer model described below is only an example, and artificial intelligence models with various architectures for generating the second content 760 including an image-audio pair by reflecting a user preference may be used.

In an embodiment, the neural style transfer model receives first content and at least one feature of the first content. In this case, the first content may be at least one of an image or audio. The embodiment in which the electronic device 2000 detects at least one feature of first content is described above, and thus, redundant descriptions will be omitted.

In an embodiment, before changing the style of the content, the electronic device 2000 may determine an image-audio pair by determining other content corresponding to the first content. In this case, an image-audio bonding weight of the neural style transfer model may be used. The image-audio bonding weight may be updated during a training and inference process of the neural style transfer model.

In some embodiments, the first content may be an image 710. The electronic device 2000 may obtain at least one feature of the image 710 according to the above-described embodiments. The electronic device 2000 may determine audio 720 corresponding to the image 710, based on the image-audio bonding weight. In this case, a neural style transfer model may be used, and the image 710 and at least one feature of the image 710 may be input to the neural style transfer model.

In some embodiments, the first content may be audio 720. The electronic device 2000 may obtain at least one feature of the audio 720 according to the above-described embodiments. The electronic device 2000 may determine the image 710 corresponding to the audio 720, based on the image-audio bonding weight. In this case, a neural style transfer model may be used, and the audio 720 and at least one feature of the audio 720 may be input to the neural style transfer model.

In an embodiment, the neural style transfer model may include a first sub-network 730 (user-preferred image style transfer network) configured to change the style of an image, and a second sub-network 740 configured to change the style of audio (user-preferred audio style transfer network). In this case, the neural style transfer model may include a paired network 750 in which at least some layers of the first sub-network 730 are connected to at least some layers of the second sub-network 740, for weight sharing between the first sub-network 730 and the second sub-network 740.

According to an embodiment, when the image 710 and the audio 720 are determined from the first content, the style of the image 710 may be changed by using the first sub-network 730, and the style of the audio 720 may be changed by using the second sub-network 740. In some embodiments, a user-preferred image style previously learned by the first network 730 may be applied to the image 710, and a user-preferred audio style previously learned by the second network 740 may be applied to the audio 720.

The electronic device 2000 may obtain the second content 760 including an image-audio pair to which a user-preferred style is applied, by changing the style of the image 710 to the user-preferred image style by using the first network 730, and changing the style of the audio 720 to the user-preferred audio style by using the second network 740.

In an embodiment, the neural style transfer model may be a model that has further learned data related to user preferences based on a pre-trained style transfer model, such that a user-preferred style is reflected when the electronic device 2000 changes the style of content. For example, the neural style transfer model may be a model that has learned user-preferred styles identified from a usage history of the electronic device 2000. In another example, the neural style transfer model may be a model that has learned user-preferred styles, which may correspond to the content viewing environment of the electronic device 2000. Specific data from which the electronic device 2000 learns data related to user-preferred styles will be described below.

In an embodiment, in order to generate the second content 760, the electronic device 2000 may obtain the usage history of the electronic device 2000, and input, to the neural style transfer model, the usage history of the electronic device 2000, the first content, and at least one feature of the first content. In this case, the second content 760 may be generated by the neural style transfer model applying a user-preferred style determined based on the usage history of the electronic device 2000, to the contents of the first content. For example, the electronic device 2000 may determine, based on content viewing statistics included in the usage history, that the user prefers content with a lively atmosphere (e.g., TV entertainment shows or comedies), and generate second content to which a bright and colorful theme style is applied.

In an embodiment, in order to generate the second content 760, the electronic device 2000 may obtain content viewing environment information including the illuminance and chromaticity of the space where the electronic device 2000 is located, and input, to the neural style transfer model, the content viewing environment information of the electronic device 2000, the first content, and at least one feature of the first content. In this case, the second content 760 may be generated by the neural style transfer model applying a user-preferred style determined based on the content viewing environment information of the electronic device 2000, to the contents of the first content, to the electronic device 2000. For example, the electronic device 2000 may identify, based on the content viewing environment information of the electronic device 2000, that the space where the electronic device 2000 is located is dark due to low illuminance, and generate second content to which a dark and calm theme is applied.

In some embodiments, the electronic device 2000 may use both the usage history of the electronic device 2000 and the content viewing environment information of the electronic device 2000 to generate the second content 760.

Meanwhile, the neural style transfer model illustrated in FIG. 7 is only an example. In some embodiments, the neural style transfer model may include a plurality of models. The neural style transfer model may include a first model configured to change the style of an image, and a second model configured to change the style of audio. In this case, the electronic device 2000 may generate second content including an image-audio pair in which a user-preferred style is reflected, by using the first model and the second model.

FIG. 8 is a flowchart of an operation, performed by an electronic device, of training a neural style transfer model, according to an embodiment of the present disclosure.

In operation S810, the electronic device 2000 obtains at least one of a usage history and content viewing environment information of the electronic device.

In an embodiment, the usage history of the electronic device 2000 may include a history related to applications that have been executed on the electronic device 2000, and a history of external sources that have been connected to and used by the electronic device 2000. A detailed usage history of the electronic device 2000 will be further described below with reference to FIG. 9A.

In an embodiment, the content viewing environment information of the electronic device 2000 may include the illuminance and chromaticity of the space where the electronic device 2000 is located. In some embodiments, neural style transfer may be further included. The content viewing environment information may be obtained in various manners, for example, may be received by one or more sensors built into the electronic device 2000 to sense data, or a separate sensor external to the electronic device 2000, or may be received through a user input.

The usage history and the content viewing environment information of the electronic device 2000 may be used as training data for the neural style transfer model. The electronic device 2000 may perform certain preprocessing on the usage history and the content viewing environment information of the electronic device 2000 such that the neural style transfer model may learn user-preferred styles, and then train the neural style transfer model.

In operation S820, the electronic device 2000 extracts image features from image content and extracts audio features from audio content. The method, performed by the electronic device 2000, of detecting features of content is described above, and thus, redundant descriptions will be omitted. The electronic device 2000 may extract features from a training image and training audio included in a training dataset. In this case, the training image and training audio may be paired for correlation learning. The electronic device 2000 may perform certain preprocessing on the image features and the audio features, and then train the neural style transfer model such that the neural style transfer model may determine other content corresponding to the first content. That is, the electronic device 2000 may train the neural style transfer model to, when the first content is an image, determine audio corresponding to the image, and when the first content is audio, determine an image corresponding to the audio.

In operation S830, the electronic device 2000 updates weights in the first sub-network and the second sub-network for learning of an image-audio correlation and application of a user-preferred style to content. The electronic device 2000 may update the weights in the first sub-network and the second sub-network by training the neural style transfer model by using training data.

In an embodiment, the training data described below may have undergone preprocessing for training the neural style transfer model.

In an embodiment, the electronic device 2000 may update image-audio bonding weights that enable the neural-style transfer model to output an image-audio pair, by using image-audio pairs and features of each image and audio included in the training data. The electronic device 2000 may update weights that enable the neural style transfer model to output a style-changed image-audio pair, by using a style image and style audio included in the training data.

In some embodiments, the electronic device 2000 may update weights that enable the neural style transfer model to apply a user-preferred style to content, based on a usage history of the electronic device 2000 included in the training data.

In some embodiments, the electronic device 2000 may update weights that enable the neural style transfer model to apply a style similar to a content viewing environment of the user to content, based on content viewing environment information included in the training data.

In operation S840, the electronic device 2000 may repeat training such that an image-audio pair in which the user's preference is reflected is generated. The electronic device 2000 may calculate a loss while training the neural style transfer model by using the training data. The electronic device 2000 may optimize the neural style transfer model by repeating training of the neural style transfer model to minimize the loss through loss calculation and backpropagation.

Figure 9A:
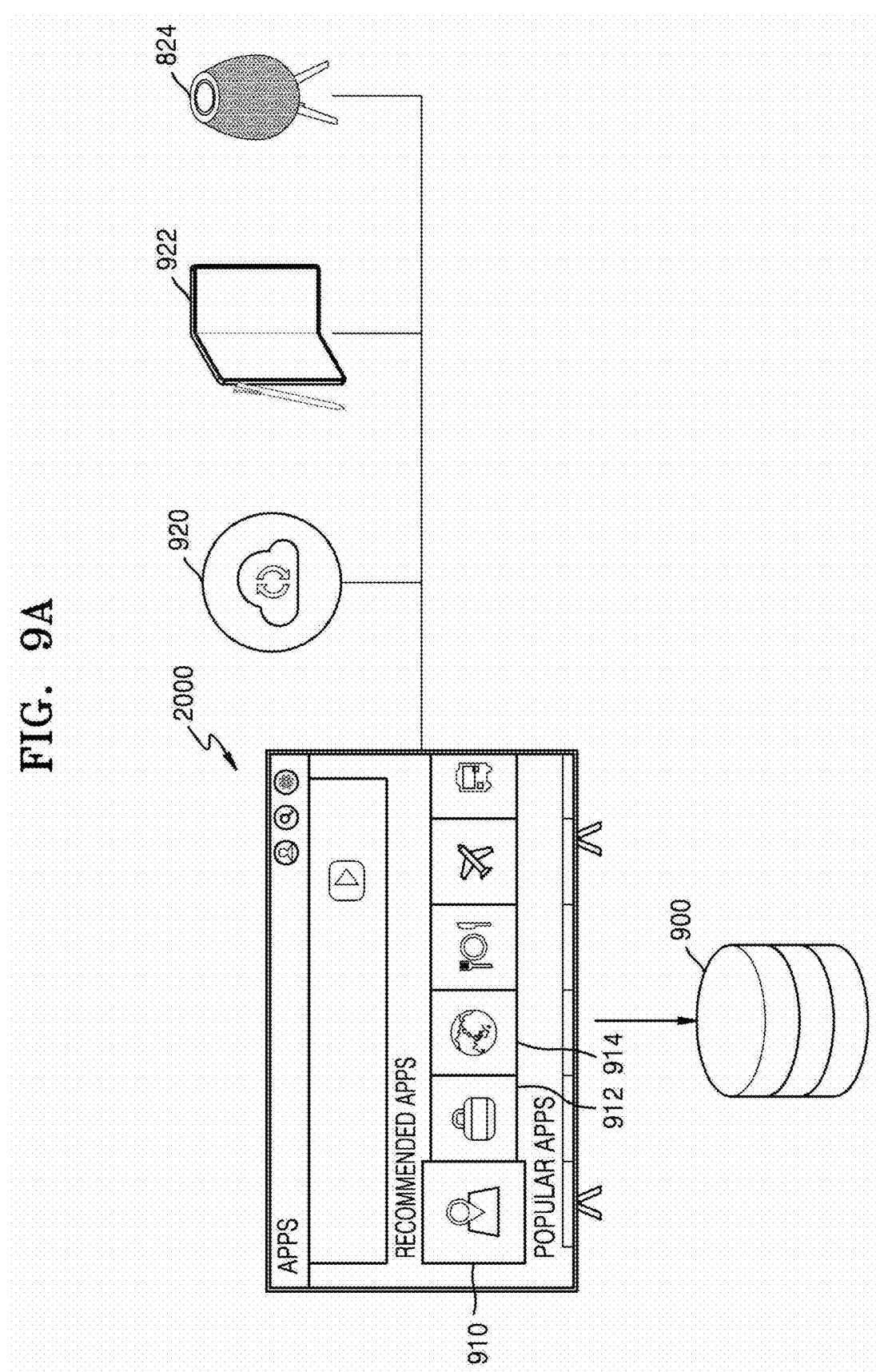
FIG. 9A is a diagram for describing a usage history of an electronic device included in training data for a neural style transfer model, according to an embodiment of the present disclosure.

FIG. 9A is a diagram for describing a usage history of an electronic device included in training data for a neural style transfer model, according to an embodiment of the present disclosure.

In an embodiment, training data 900 may include a usage history of the electronic device 2000. The usage history of the electronic device 2000 includes a usage history related to applications that have been executed on the device, a usage history related to external sources that have been connected to and used by the device, and a usage history obtained from another electronic device of the user.

In an embodiment, a plurality of applications may be installed in the electronic device 2000. For example, application A 910, application B 912, application C 914, and the like may be installed in the electronic device 2000. The electronic device 2000 may store various histories that may be obtained as applications are executed. The usage history related to applications may include, for example, the name of the application, the number of executions of the application, the time and date of execution of the application, the proportion of execution of the application, the type of the application (e.g., over-the-top (OTT), media service application, video application, or game application), information about content used by the application, usage time of content used in the application, and the like, but is not limited thereto.

In an embodiment, various types of external sources may be connected to the electronic device 2000. For example, external sources, such as a set-top box, a desktop PC, or a mobile phone, may be connected to the electronic device 2000 to provide content. However, the types of external sources to be connected to the electronic device 2000 described above are only examples, and the present disclosure is not limited thereto. The electronic device 2000 may store various histories that may be obtained as external sources are connected to and used by the electronic device 2000. The usage history related to external sources may include the time and date when the external source was connected, the number of times of connection, an application running when the external source was connected, information about content used when the external source was connected, usage time of content used when the external source was connected, and the like, but is not limited thereto.

In an embodiment, the electronic device 2000 may obtain a history related to other electronic devices of the user, from an external source. The other electronic devices of the user may include, for example, an external server 920 (e.g., a cloud service), a mobile phone 922, a speaker 924 (e.g., an artificial intelligence speaker), and the like. In detail, the history related to other electronic devices may include content stored in the external server 920, activity records of the mobile phone 922 (e.g., music reproduced, places visited, photos taken, messages, or social networking service (SNS) activities), music reproduced through the speaker 924, and the like.

In order to train the neural style transfer model to apply a user-preferred style, the electronic device 2000 may generate the training data 900 by performing certain preprocessing on the usage history of the electronic device 2000 described above.

Figure 9B:
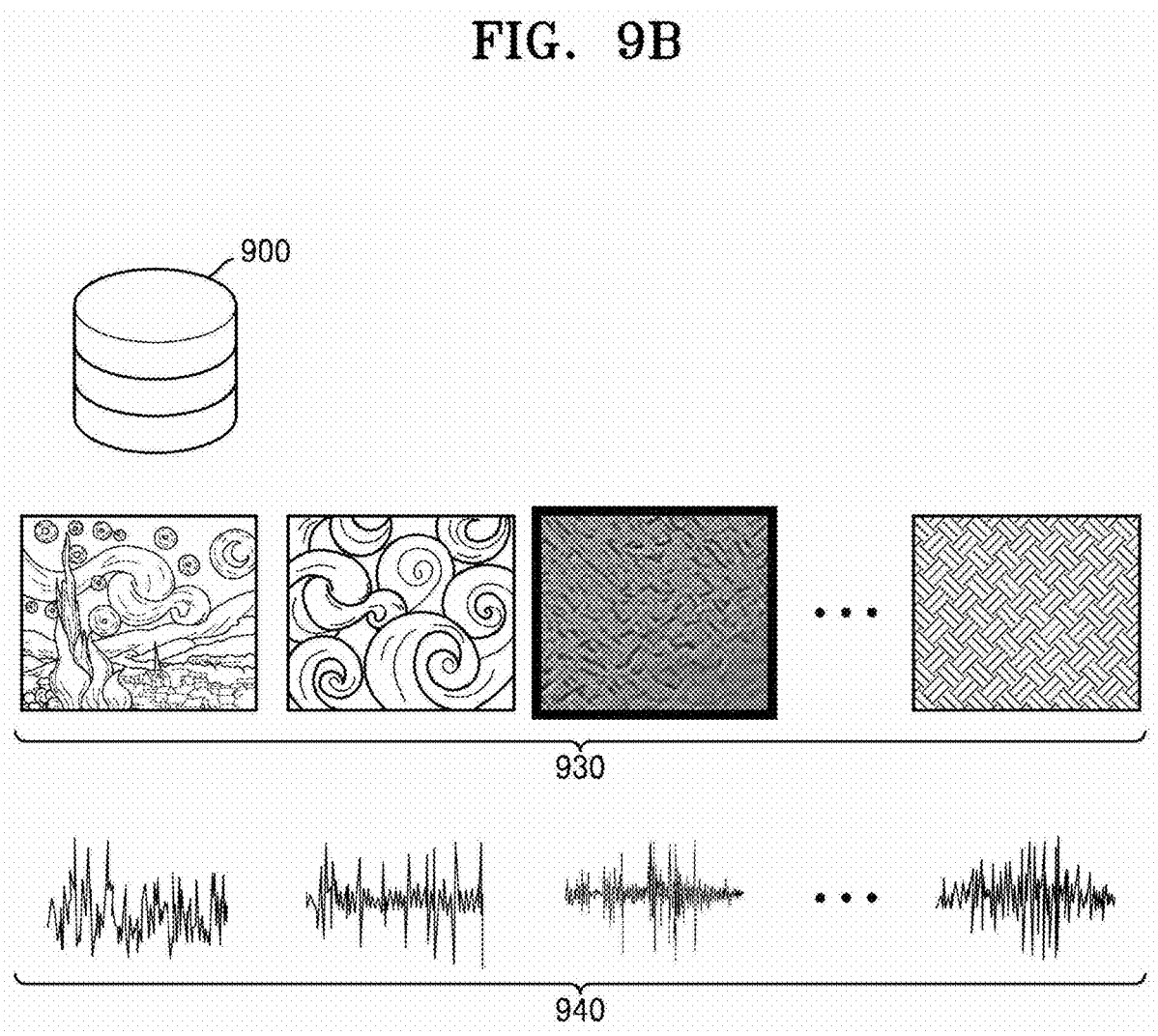
FIG. 9B is a diagram for describing a usage history of an electronic device included in training data for a neural style transfer model, according to an embodiment of the present disclosure.

FIG. 9B is a diagram for describing a usage history of an electronic device included in training data for a neural style transfer model, according to an embodiment of the present disclosure.

In an embodiment, the training data 900 may include style images 930 and pieces of style audio 940. The style images represent styles to be applied to images, and the pieces of style audio represent styles to be applied to pieces of audio. The electronic device 2000 may change the style of obtained first content by learning the style images 930 and the pieces of style audio 940 included in the training data 900.

In an embodiment, when the first content is obtained, the neural style transfer model may automatically apply a previously learned image style and audio style to the first content and other content (i.e., an image-audio pair) corresponding to the first content, based on a user preference. In some embodiments, based on a user input for selecting and/or inputting a particular style image and/or audio, the neural style transfer model may extract the style of the selected/input image/audio. The neural style transfer model may apply the extracted style to the first content and the other content (i.e., an image-audio pair) corresponding to the first content.

Meanwhile, the training data 900 for the neural style transfer model for applying a user-preferred style to content may further include other data.

For example, the training data 900 may include content feature information. Image features may include, for example, the color tone of an image, the type, location, and size of a main object in the image, and the type, location, and size of a subobject, but are not limited thereto. Audio features may include the genre of the audio, the main frequency bandwidth of the audio, loudness, spectral flatness, spectral irregularity, pitch, modulation in the temporal domain (rate), modulation in the frequency domain (scale), and the like, but are not limited thereto.

The neural style transfer model may learn image features and audio features to, when an image is obtained as first content, determine audio corresponding to the image, and when audio is obtained as first content, determine an image corresponding to the audio.

For example, the training data 900 may include content viewing environment information. The neural style transfer model may include content viewing environment information. The content viewing environment information may include, but is not limited to, various pieces of information such as the illuminance and chromaticity of the space where the electronic device 2000 is located, the ambient temperature of the electronic device 2000, weather, ambient noise, time, and the like.

When determining a user-preferred style to be applied to the first content, the neural style transfer model may determine, based on the content viewing environment information, a user-preferred style suitable for the content viewing environment. The neural style transfer model may generate second content including an image-audio pair by applying the determined user-preferred style to the first content.

In order to train the neural style transfer model to generate second content in which a user-preferred style is reflected, the electronic device 2000 may generate the training data 900 by performing certain preprocessing on the above-described style images, pieces of style audio, image features, audio features, and content viewing environment information.

Figure 10:
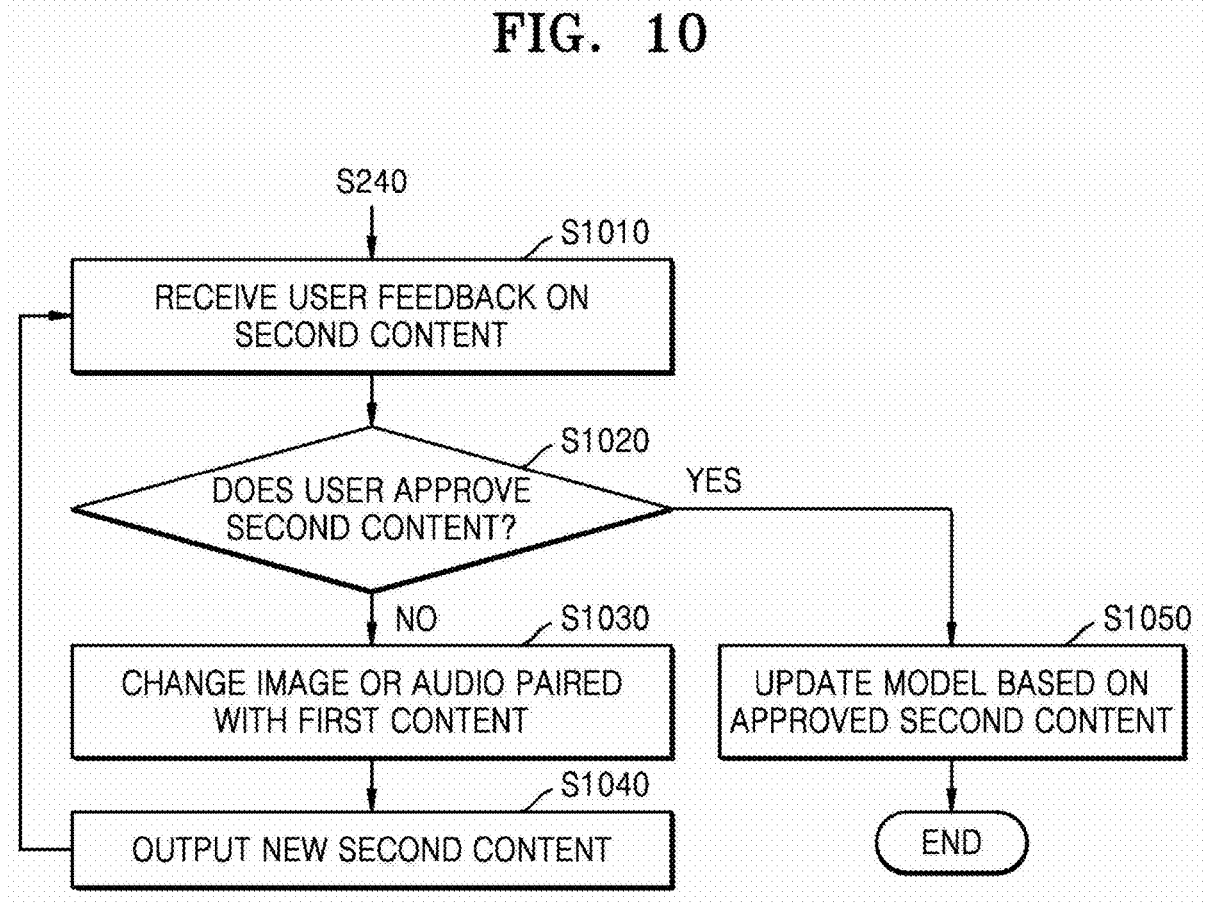
FIG. 10 is a flowchart of an operation, performed by an electronic device, of training a neural style transfer model, according to an embodiment of the present disclosure.

FIG. 10 is a flowchart of an operation, performed by an electronic device, of training a neural style transfer model, according to an embodiment of the present disclosure.

Operation S1010 of FIG. 10 may be performed after operation S240 of FIG. 2 is performed.

In operation S1010, the electronic device 2000 receives user feedback on second content. When generating second content, the electronic device 2000 may generate one or more pieces of second content. For example, the electronic device 2000 may generate second content A, second content B, second content C, and the like.

In an embodiment, the plurality of pieces second content may include different pieces of second content that are determined to correspond to the same first content. For example, when the first content is image A, second content A may be an image-audio pair consisting of style-changed image A and style-changed audio A, and second content B may be an image-audio pair consisting of style-changed image A and style-changed audio B. That is, image A may be maintained, and only the audio determined to correspond to the image may be different.

In another example, when the first content is audio A, second content A may be an image-audio pair consisting of style-changed image A and style-changed audio A, and second content B may be an image-audio pair consisting of style-changed image B and style-changed audio A. That is, audio A may be maintained, and only the image determined to correspond to the audio may be different.

When a plurality of pieces of second contents are generated, each generated second content may include an order according to priority. The electronic device 2000 may output the second content with the highest priority and receive user feedback.

In operation S1020, the electronic device 2000 identifies whether the user approves the second content. When the user rejects the generated second content because the second content does not meet the user's preference, the electronic device 2000 performs operation S1030. When the user approves the generated second content because the second content meets the user's preference, the electronic device 2000 performs operation S1050. In this case, the second content displayed in operation S240 may be maintained without change.

In operation S1030, the electronic device 2000 changes the image or audio paired with the first content. The electronic device 2000 may maintain the first content and change the other content that has been determined to correspond to the first content and paired with the first content. For example, in a case in which the first content is an image, the electronic device 2000 may change the audio, and in a case in which the first content is audio, the electronic device 2000 may change the image. In detail, there may be a case in which the first content was image A, and generated second content A was an image-audio pair consisting of style-changed image A and style-changed audio A. In this case, when the user rejects second content A, the electronic device 2000 may select second content B with the next priority. Second content B may consist of style-changed image A and style-changed audio B. The electronic device 2000 may decrease bonding weight values for the image-audio pair included in the second content rejected by the user.

In operation S1040, the electronic device 2000 outputs new second content. For example, after second content A is output, when the user rejects second content A, the electronic device 2000 may output second content B. Based on user feedback, the electronic device 2000 may repeat the above-described operations until the user approves the second content.

In operation S1050, the electronic device 2000 updates the neural style transfer model based on the approved second content. The electronic device 2000 may increase bonding weight values for the image-audio pair included in the second content approved by the user.

Figure 11:
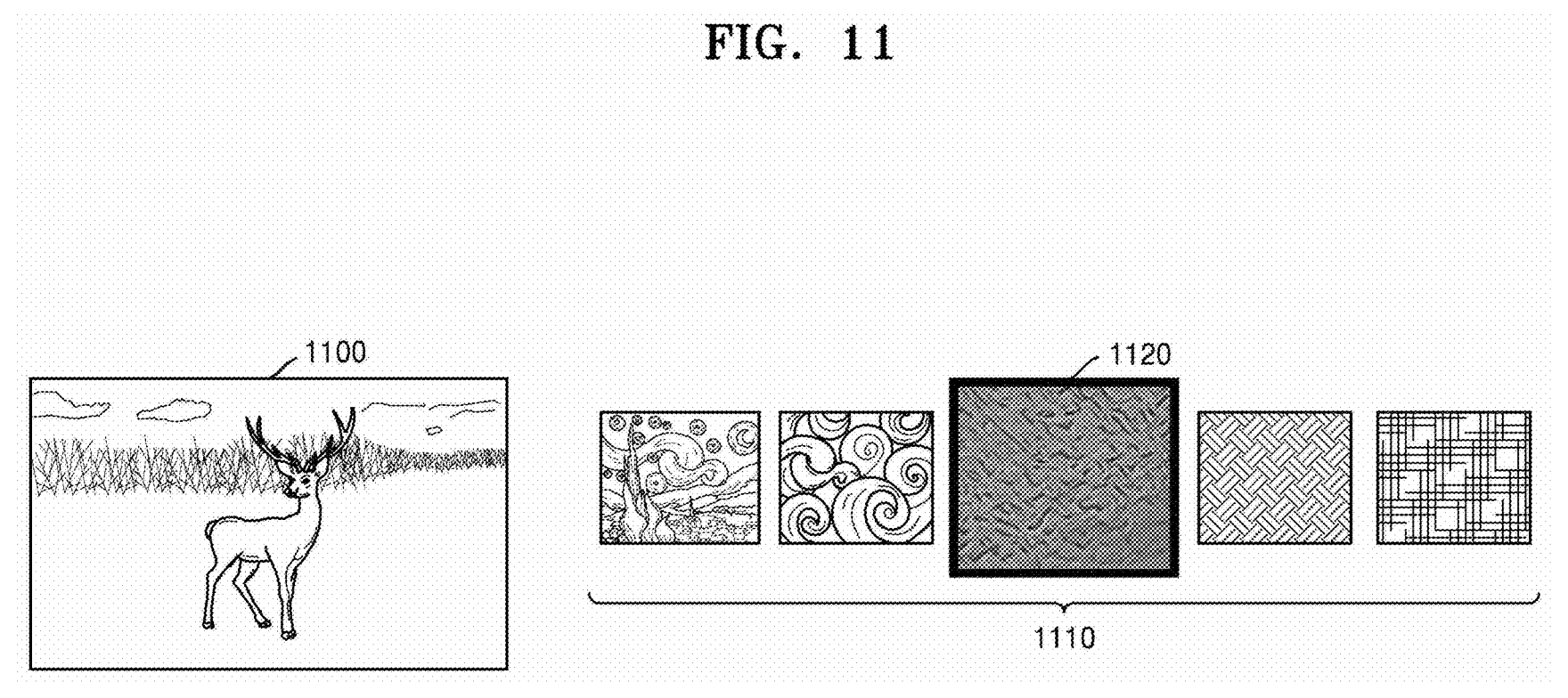

FIG. 11 is a diagram for describing an operation, performed by an electronic device, of receiving an input of a preferred style from a user, according to an embodiment of the present disclosure.

In an embodiment, the neural style transfer model may receive an input of first content and generate second content by automatically applying a user-preferred style, but may also receive an input for selecting a preferred style from the user and generate second content by applying the selected style.

For convenience of description, an example in which the first content is an image will be described with reference to FIG. 10. However, the following descriptions may be equally applied to a case in which the first content is audio.

In an embodiment, the electronic device 2000 may obtain an image 1100, which is first content, and display a plurality of style images 1110 applicable to the image 1100. The electronic device 2000 may receive a user input for selecting any one of the plurality of style images 1110. For example, when the user selects a particular style image 1120 from among the plurality of style images 1110, the electronic device 2000 may apply the selected style image 1120 to the image 1100. In this case, the electronic device 2000 may use a neural style transfer model.

In an embodiment, the electronic device 2000 may determine audio corresponding to the image 1100 and apply a user-preferred audio style to be applied to the audio. The electronic device 2000 may generate second content including an image-audio pair to which a user-preferred style is applied.

Figure 12:
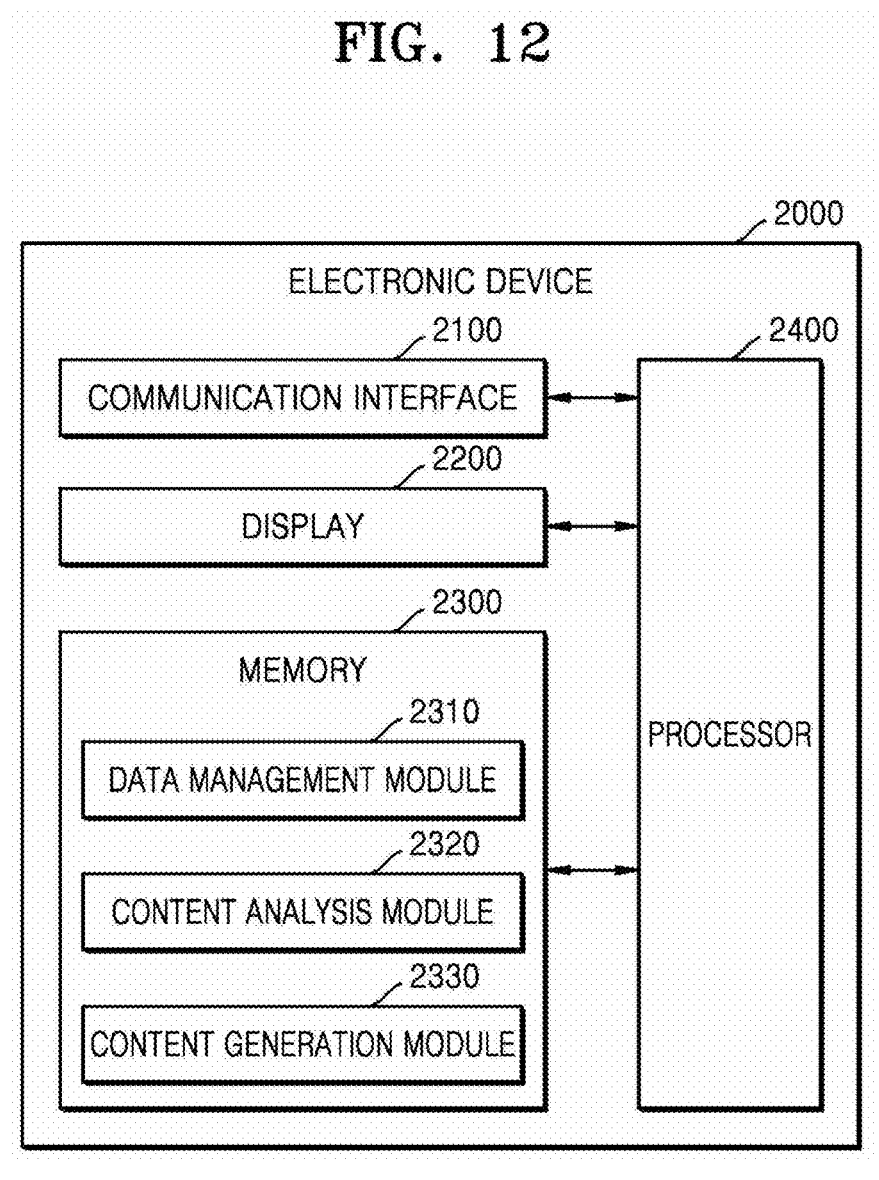
FIG. 12 is a block diagram illustrating a configuration of an electronic device according to an embodiment of the disclosure.

FIG. 12 is a block diagram illustrating a configuration of an electronic device according to an embodiment of the disclosure.

Referring to FIG. 12, the electronic device 2000 may include a communication interface 2100, a display 2200, a memory 2300, and a processor 2400.

The communication interface 2100 may perform data communication with other electronic devices under control of the processor 2300.

The communication interface 2100 may include a communication circuit capable of performing data communication between the electronic device 2000 and other devices by using at least one of data communication schemes, for example, wired local area network (LAN), wireless LAN, Wi-Fi, Bluetooth, ZigBee, Wi-Fi Direct (WFD), Infrared Data Association (IrDA), Bluetooth Low Energy (BLE), near-field communication (NFC), wireless broadband (Wi-Bro), Worldwide Interoperability for Microwave Access (WiMAX), Shared Wireless Access Protocol (SWAP), Wireless Gigabit Alliance (WiGig), or radio-frequency (RF) communication.

The communication interface 2100 may transmit data for generating second content to an external device. For example, the communication interface 2100 may receive first content or receive a neural style transfer model and training data for training the neural style transfer model.

The display 2200 may output an image signal to a screen of the electronic device 2000 under control of the processor 2400. The display 2200 may display second content generated by the processor 2400.

The memory 2300 may store instructions, data structures, and program code that are readable by the processor 2400. In the disclosed embodiments, operations performed by the processor 2400 may be implemented by executing instructions or code of a program stored in the memory 2300.

The memory 2300 may include a flash memory-type memory, a hard disk-type memory, a multimedia card micro-type memory, a card-type memory (e.g., an SD memory, an XD memory, etc.), a non-volatile memory including at least one of read-only memory (ROM), electrically erasable programmable ROM (EEPROM), programmable ROM (PROM), a magnetic memory, a magnetic disk, or an optical disk, and a volatile memory such as random-access memory (RAM) or static RAM (SRAM).

The memory 2300 may store one or more instructions and/or programs for generating stylized second content. For example, the memory 2300 may store a data management module 2310, a content analysis module 2320, and a content generation module 2330.

The processor 2400 may control overall operations of the electronic device 2000. For example, the processor 2400 may execute one or more instructions of a program stored in the memory 2300 to control the overall operations of the electronic device 2000 to generate second content.

For example, the processor 2400 may include, but is not limited to, at least one of a central processing unit (CPU), a microprocessor, a graphics processing unit (GPU), an application-specific integrated circuits (ASIC), a digital signal processor (DSP), a digital signal processing device (DSPDs), a programmable logic device (PLD), a field-programmable gate array (FPGAs), an application processor, a neural processing unit, or a dedicated artificial intelligence processor designed in a hardware structure specialized for processing an artificial intelligence model.

In an embodiment, the processor 2400 may execute the data management module 2310 to manage data used to generate second content.

The processor 2400 may collect a usage history of the electronic device 2000. The usage history of the electronic device 2000 may include a history related to applications that have been executed on the electronic device 2000, a history of external sources that have been connected to and used by the electronic device 2000, and a history related to other electronic devices of the user of the electronic device 2000. This is described above, and thus, redundant descriptions will be omitted. The collected usage history may be used as training data for the neural style transfer model.

The processor 2400 may store and manage data that may be obtained from the outside of the electronic device 2000 (e.g., content viewing information, training data for training the neural style transfer model, or first content).

In an embodiment, the processor 2400 may execute the content analysis module 2320 to analyze first content. The processor 2400 may detect at least one feature of content by applying the first content to a content feature detection model. The processor 2400 may identify the type of the first content and select a content feature detection model corresponding to the type of the first content. The processor 2400 may detect one or more features from the first content by using the selected content feature detection model.

In an embodiment, the processor 2400 may execute the content generation module 2330 to generate second content to which a user-preferred style is applied. The processor

2400 may generate second content by applying the first content and at least one feature of the first content to the neural style transfer model. The second content generated by the neural style transfer model may be content including an image-audio pair, to which the user-preferred style is applied.

Figure 13:
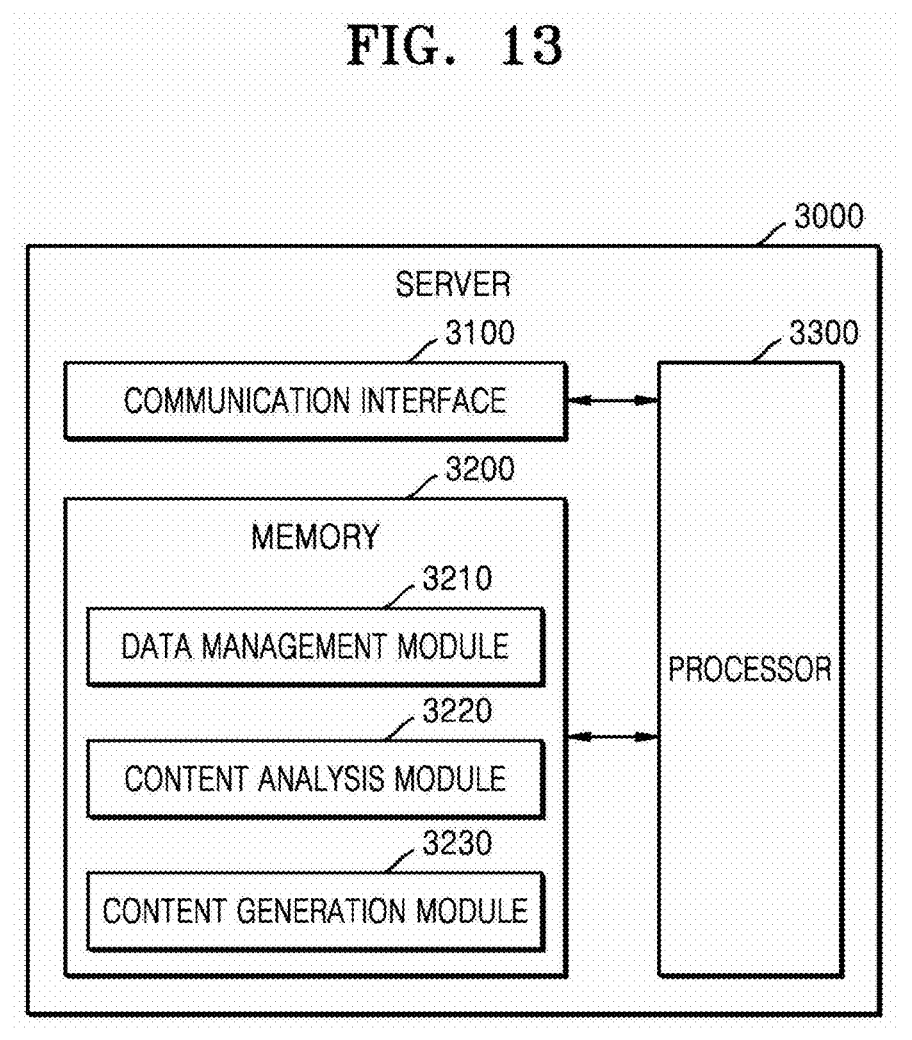

FIG. 13 is a block diagram illustrating a configuration of a server according to an embodiment of the disclosure.

In an embodiment, the above-described operations for the electronic device 2000 to generate second content may be performed by a server 3000.

The server 3000 may include a communication interface 3100, a memory 3200, and a processor 3300. The communication interface 3100, the memory 3200, and the processor 3300 of the server 3000 correspond to the communication interface 2100, the memory 2300, and the processor 2400 of the electronic device 2000 OF FIG. 12, respectively, and thus, redundant descriptions will be omitted.

The server 3000 may be a device having higher computing performance than that of the electronic device 2000 and thus capable of performing a larger amount of computation. The server 3000 may perform training of an artificial intelligence model requiring a relatively larger amount of computation than does inference. For example, the server 3000 may train a content feature detection model and a content neural style transfer model.

The server 3000 may obtain first content from a user device (e.g., the electronic device 2000) and generate second content according to the above-described embodiments. The server 3000 may transmit the generated second content to the user device such that the second content may be output from the user device.

The disclosed embodiments provide an electronic device capable of generating user-preferred content including an image-audio pair by using input content of any one of an image or audio, and an operating method of the electronic device.

According to an aspect of the present disclosure, a method, performed by an electronic device, of generating user-preferred content may be provided.

The method may include obtaining first content including at least one of an image or audio.

The method may include detecting at least one feature to be used to change a style of content, by applying the first content to a feature detection model.

The method may include generating second content including an image-audio pair by applying the first content and the at least one feature of the first content to a neural style transfer (NST) model.

The neural style transfer model may be trained to determine an image or audio to be included in the second content, and generate the second content by changing a style of the first content.

The method may include outputting the second content.

The method may include obtaining a usage history of the electronic device.

The generating of the second content may include further applying the usage history of the electronic device to the neural style transfer model.

The usage history of the electronic device may include at least one of a history related to applications that have been executed by the electronic device, a history related to content that has been reproduced by the electronic device, and a history related to external sources that have been connected to and used by the electronic device.

The method may include obtaining content viewing environment information including at least one of illuminance and chromaticity of a space where the electronic device is located.

The generating of the second content may include further applying the content viewing environment information to the neural style transfer model.

The detecting of the at least one feature of the first content may include, based on the first content being an image, detecting one or more main objects from the image.

The detecting of the at least one feature of the first content may include determining the main object based on a user input.

Training data for training the neural style transfer model may include at least one of a style image, style audio, a usage history of the electronic device, content feature information, or content viewing environment information.

The neural style transfer model may include a first sub-network configured to change a style of an image and a second sub-network configured to change a style of audio.

In the neural style transfer model, at least some layers of the first sub-network may be connected to at least some layers of the second sub-network, for weight sharing between the first sub-network and the second sub-network.

The method may include changing an image or audio paired with the first content, based on user feedback on the second content.

The method may include updating the neural style transfer model based on the image-audio pair included in the second content that has been changed based on the user feedback.

According to an aspect of the present disclosure, an electronic device for generating user-preferred content may be provided.

The electronic device may include: a communication interface; a memory storing one or more instructions; and a processor configured to execute the one or more instructions stored in the memory.

By executing the one or more instructions, the processor may obtain first content including at least one of an image or audio.

By executing the one or more instructions, the processor may detect at least one feature to be used to change a style of content, by applying the first content to a feature detection model.

By executing the one or more instructions, the processor may generate second content including an image-audio pair by applying the first content and the at least one feature of the first content to a neural style transfer (NST) model.

The neural style transfer model may be trained to determine an image or audio to be included in the second content, and generate the second content by changing a style of the first content.

By executing the one or more instructions, the processor may output the second content.

By executing the one or more instructions, the processor may obtain a usage history of the electronic device.

By executing the one or more instructions, the processor may further apply the usage history of the electronic device to the neural style transfer model.

The usage history of the electronic device may include at least one of a history related to applications that have been executed by the electronic device, a history related to content that has been reproduced by the electronic device, and a history related to external sources that have been connected to and used by the electronic device.

By executing the one or more instructions, the processor may obtain content viewing environment information including at least one of illuminance and chromaticity of a space where the electronic device is located.

By executing the one or more instructions, the processor may further apply the content viewing environment information to the neural style transfer model.

By executing the one or more instructions, the processor may, based on the first content being an image, detect one or more main objects from the image.

By executing the one or more instructions, the processor may determine the main object based on a user input.

The neural style transfer model may include a first sub-network configured to change a style of an image and a second sub-network configured to change a style of audio.

In the neural style transfer model, at least some layers of the first sub-network may be connected to at least some layers of the second sub-network, for weight sharing between the first sub-network and the second sub-network.

By executing the one or more instructions, the processor may change an image or audio paired with the first content, based on user feedback on the second content.

By executing the one or more instructions, the processor may update the neural style transfer model based on the image-audio pair included in the second content that has been changed based on the user feedback.

Embodiments of the present disclosure may be implemented as a recording medium including computer-executable instructions such as a computer-executable program module. A computer-readable medium may be any available medium which is accessible by a computer, and may include a volatile or non-volatile medium and a detachable and non-detachable medium. Also, the computer-readable medium may include a computer storage medium and a communication medium. The computer storage media include both volatile and non-volatile, detachable and non-detachable media implemented in any method or technique for storing information such as computer readable instructions, data structures, program modules or other data. The communication medium may typically include computer-readable instructions, data structures, or other data of a modulated data signal such as program modules.

In addition, the computer-readable storage medium may be provided in the form of a non-transitory storage medium. Here, the term 'non-transitory storage medium' refers to a tangible device and does not include a signal (e.g., an electromagnetic wave), and the term 'non-transitory storage medium' does not distinguish between a case where data is stored in a storage medium semi-permanently and a case where data is stored temporarily. For example, the 'non-transitory storage medium' may include a buffer in which data is temporarily stored.

According to an embodiment, methods according to various embodiments disclosed herein may be included in a computer program product and then provided. The computer program product may be traded as commodities between sellers and buyers. The computer program product may be distributed in the form of a machine-readable storage medium (e.g., a compact disc ROM (CD-ROM)), or may be distributed online (e.g., downloaded or uploaded) through an application store or directly between two user devices (e.g., smart phones). In a case of online distribution, at least a portion of the computer program product (e.g., a downloadable app) may be temporarily stored in a machine-readable storage medium such as a manufacturer's server, an application store's server, or a memory of a relay server.

While the present disclosure have been particularly shown and described, it will be understood by one of ordinary skill in the art that various changes in form and details may be made therein without departing from the spirit and scope of the present disclosure. Therefore, it should be understood that the above-described embodiments are exemplary in all respects and do not limit the scope of the present disclosure. For example, each element described in a single type may be executed in a distributed manner, and elements described distributed may also be executed in an integrated form.

The scope of the present disclosure is not defined by the detailed description of the present disclosure but by the following claims, and all modifications or alternatives derived from the scope and spirit of the claims and equivalents thereof fall within the scope of the present disclosure.

The invention claimed is:

1. An operating method of an electronic device, the operating method comprising:

obtaining first content including at least one of an image or audio;

detecting at least one feature to be used to change a style of the first content, by applying the first content to a feature detection model;

applying the first content and the at least one feature to a neural style transfer (NST) model, wherein the NST model is trained to generate a second content based on the first content and the at least one feature applied to the NST model by changing the style of the first content, and the second content includes an image audio pair in which an image or audio is determined by the NST model; and outputting the second content, wherein the NST model includes a first sub-network configured to change a style of an image and a second sub-network configured to change a style of audio, and at least some layers of the first sub-network are connected to at least some layers of the second sub-network, for weight sharing between the first sub-network and the second sub-network.

2. The operating method of claim 1, further comprising:

obtaining a usage history of the electronic device, wherein the applying further includes applying the usage history of the electronic device to the NST model, and the NST model is further trained to generate the second content based on the usage history of the electronic device applied to the NST model.

3. The operating method of claim 2, wherein the usage history of the electronic device includes at least one of a history related to applications that have been executed by the electronic device, a history related to content that has been reproduced by the electronic device, and a history related to external sources that have been connected to and used by the electronic device.

4. The operating method of claim 1, further comprising:

obtaining content viewing environment information including at least one of illuminance and chromaticity of a space where the electronic device is located, wherein the applying further includes applying the content viewing environment information to the NST model, and the NST model is further trained to generate the second content based on the content viewing environment information applied to the NST model.

5. The operating method of claim 1, wherein the detecting of the at least one feature includes, based on the first content including an image, detecting one or more main objects from the image.

6. The operating method of claim 5, wherein the detecting of the at least one feature includes determining the one or more main objects based on a user input.

7. An electronic device comprising:

a memory storing one or more instructions; and a processor configured to execute the one or more instructions stored in the memory to:

obtain first content including at least one of an image or audio, detect at least one feature to be used to change a style of the first content, by applying the first content to a feature detection model, apply the first content and the at least one feature to a neural style transfer (NST) model, wherein the NST model is trained to generate a second content based on the first content and the at least one feature applied to the NST model by changing the style of the first content, and the second content includes an image audio pair in which an image or audio is determined by the NST model, and output the second content, wherein the NST model includes:

a first sub-network configured to change a style of an image and a second sub-network configured to change a style of audio, and at least some layers of the first sub-network are connected to at least some layers of the second sub-network, for weight sharing between the first sub-network and the second sub-network.

8. The electronic device of claim 7, wherein the processor is further configured to execute the one or more instructions to:

obtain a usage history of the electronic device, and apply the usage history of the electronic device to the NST model, and the NST model is further trained to generate the second content based on the usage history of the electronic device applied to the NST model.

9. The electronic device of claim 8, wherein the usage history of the electronic device includes at least one of a history related to applications that have been executed by the electronic device, a history related to content that has been reproduced by the electronic device, and a history related to external sources that have been connected to and used by the electronic device.

10. The electronic device of claim 7, wherein the processor is further configured to execute the one or more instructions to:

obtain content viewing environment information including at least one of illuminance and chromaticity of a space where the electronic device is located, and apply the content viewing environment information to the NST model, and the NST model is further trained to generate the second content based on the content viewing environment information applied to the NST model.

11. The electronic device of claim 7, wherein the processor is further configured to execute the one or more instructions to:

based on the first content including an image, detect one or more main objects from the image.

12. The electronic device of claim 11, wherein the processor is further configured to execute the one or more instructions to:

determine the one or more main objects based on a user input.

13. A non-transitory computer-readable recording medium having recorded thereon a program for executing, on a computer, the operating method of claim 1.

\* \* \* \* \*